(12) United States Patent
Wen

(10) Patent No.: US 11,472,239 B2
(45) Date of Patent: Oct. 18, 2022

(54) APPARATUS AND METHODS FOR ROBOTICALLY SERVICING A VEHICLE WHEEL

(71) Applicant: Hongcai Wen, Mississauga (CA)

(72) Inventor: Hongcai Wen, Mississauga (CA)

( * ) Notice: Subject to any disclaimer, the term of this patent is extended or adjusted under 35 U.S.C. 154(b) by 0 days.

(21) Appl. No.: 16/403,477

(22) Filed: May 3, 2019

(65) Prior Publication Data

US 2019/0389258 A1 Dec. 26, 2019

Related U.S. Application Data

(63) Continuation-in-part of application No. 16/104,792, filed on Aug. 17, 2018, now Pat. No. 10,926,365.

(60) Provisional application No. 62/666,481, filed on May 3, 2018, provisional application No. 62/670,596, filed on May 11, 2018, provisional application No. 62/547,757, filed on Aug. 19, 2017, provisional application No. 62/561,486, filed on Sep. 21, 2017.

(51) Int. Cl.
*B60C 25/05* (2006.01)
*B60C 25/138* (2006.01)

(52) U.S. Cl.
CPC ...... *B60C 25/0515* (2013.01); *B60C 25/0548* (2013.01); *B60C 25/138* (2013.01); *B60B 2340/50* (2013.01); *B60B 2900/531* (2013.01)

(58) Field of Classification Search
CPC ............ B60C 25/0515; B60C 25/0548; B60C 25/138; B60C 25/234
See application file for complete search history.

(56) References Cited

U.S. PATENT DOCUMENTS

| 4,735,250 | A | * | 4/1988 | Kane ................... B60C 25/145 157/1.1 |
| 5,387,069 | A | | 2/1995 | Asaumi et al. |
| 8,086,340 | B2 | * | 12/2011 | Kondo .................. G01B 21/26 700/114 |
| 8,776,345 | B2 | * | 7/2014 | Komatsu ................ B23P 21/00 29/430 |
| 10,493,799 | B2 | * | 12/2019 | Hedley ................. B60B 29/001 |
| 2006/0288577 | A1 | * | 12/2006 | Bormuth ................ B23P 19/10 29/894 |
| 2007/0290179 | A1 | | 12/2007 | Hedley et al. |

(Continued)

FOREIGN PATENT DOCUMENTS

| GB | 2366545 A | 3/2002 |
| WO | 2014/081573 A1 | 5/2014 |
| WO | 2017/004665 A1 | 1/2017 |

*Primary Examiner* — Christopher R Harmon
(74) *Attorney, Agent, or Firm* — Stuart L. Wilkinson

(57) ABSTRACT

A robot tool has a chassis and a wheel servicing sub-system supported on the chassis, the wheel servicing sub-system having a sub-system interface part engageable with a wheel interface part, the wheel servicing sub-system interface part engagement with the wheel interface part permitting operation of the wheel servicing sub-system to service the wheel, and a control unit on the robot tool to control operation of the wheel servicing sub-system to effect said wheel servicing. The wheel servicing sub-system is one or more of a chassis sub-system, a tool support sub-system, a fastener detaching/attaching sub-system, a fastener storage sub-system, a jacking sub-system, a wheel gripper sub-system, a tire inspection sub-system, a tire pressure sub-system, and a wheel balancing sub-system.

17 Claims, 22 Drawing Sheets

(56) References Cited

U.S. PATENT DOCUMENTS

| | | | |
|---|---|---|---|
| 2009/0035107 A1* | 2/2009 | Duran | B60B 29/002 |
| | | | 414/426 |
| 2011/0048649 A1 | 3/2011 | Komatsu et al. | |
| 2011/0048650 A1* | 3/2011 | Lawson | B60C 25/05 |
| | | | 157/16 |
| 2013/0276306 A1* | 10/2013 | Calvi | B60B 29/007 |
| | | | 29/894.3 |
| 2014/0050554 A1* | 2/2014 | Soto | B60B 30/10 |
| | | | 414/426 |
| 2014/0288702 A1 | 9/2014 | Salamanca | |
| 2014/0314536 A1 | 10/2014 | Hedley et al. | |
| 2016/0152102 A1 | 6/2016 | Campbell | |
| 2017/0144480 A1* | 5/2017 | Kerwin | B25J 9/0093 |
| 2019/0010034 A1* | 1/2019 | Edwards, Sr. | B60B 29/001 |
| 2020/0039304 A1* | 2/2020 | Parks | B60C 25/0548 |

* cited by examiner

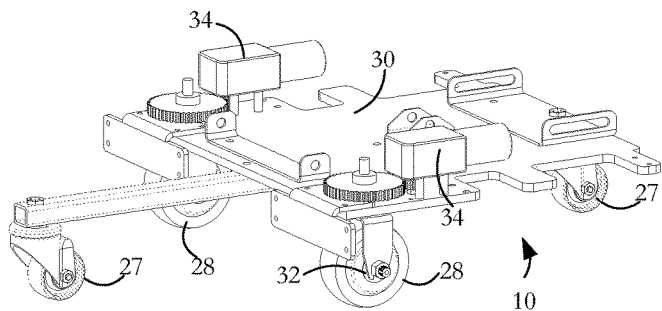
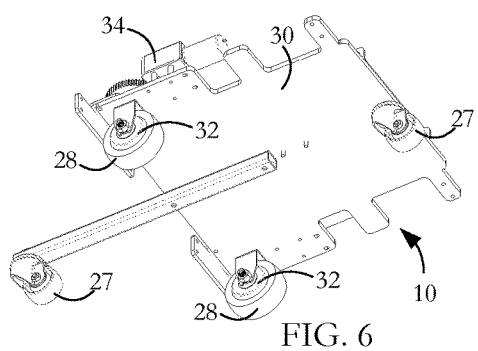
FIG. 5 　　　　　　　　　　FIG. 6
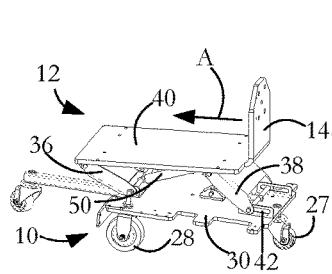
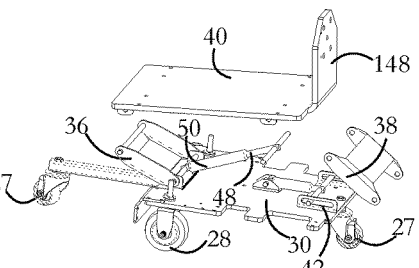
FIG. 7 　　　　　　　　　　FIG. 8
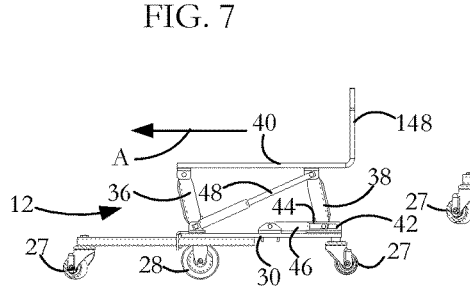
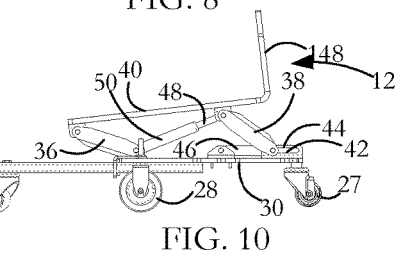
FIG. 9 　　　　　　　　　　FIG. 10
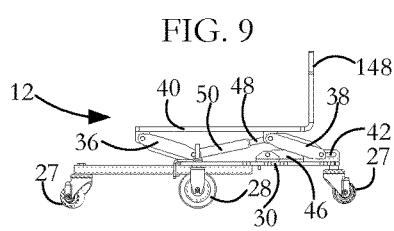
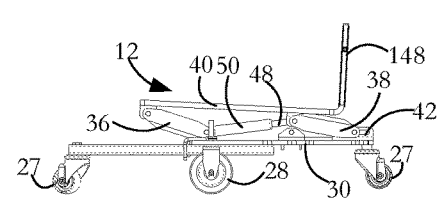
FIG. 11 　　　　　　　　　　FIG. 12

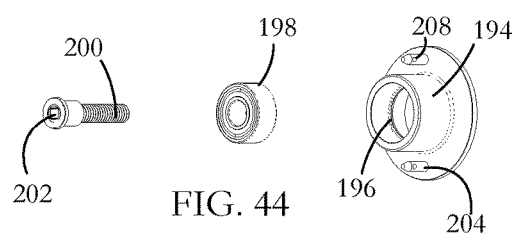 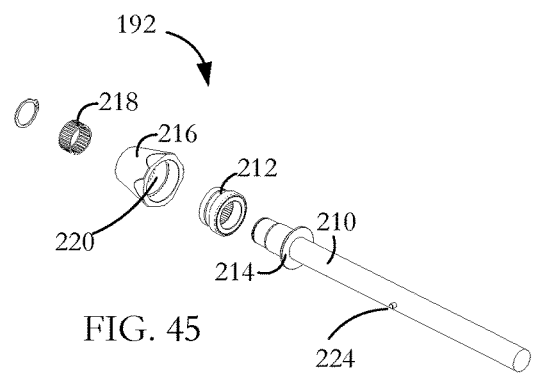
FIG. 44  FIG. 45
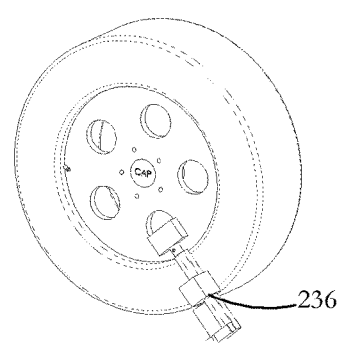 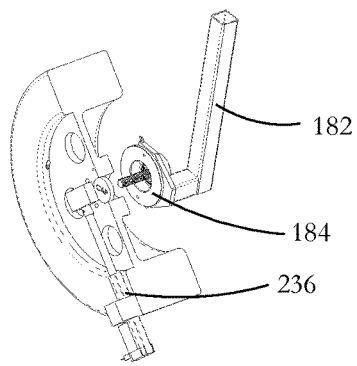
FIG. 46  FIG. 47

APPARATUS AND METHODS FOR ROBOTICALLY SERVICING A VEHICLE WHEEL

CROSS REFERENCE TO RELATED PATENTS

The present application for US filing purposes is a continuation in part of U.S. patent application Ser. No. 16/104,792 filed Aug. 17, 2018, entitled "Apparatus and method for attaching and detaching circular arrayed fasteners".

The present application claims priority pursuant to 35 U.S.C. 119(e) from U.S. Provisional Patent Application Ser. No. 62/666,481 filed May 3, 2018, entitled "Wheel loader" and U.S. Provisional Patent Application Ser. No. 62/670,596 filed May 11, 2018, entitled "Additional functions of wheel loader".

The disclosures of the above-numbered applications are hereby incorporated herein by reference in their entirety and made part of the present application for all purposes.

FIELD OF THE INVENTION

This invention relates to a robot tool for automatically servicing a vehicle wheel and to methods of servicing a vehicle wheel.

BACKGROUND

There are many possible actions that can be undertaken in order to fully service a wheel, whether it is new, mounted on a vehicle or has been removed from a vehicle for off-vehicle servicing. Such servicing may for example involve any or all of identifying the wheel to be worked on, jacking up the part of the vehicle to which the wheel is attached, releasing and removing lug nuts or other fasteners from studs on the vehicle wheel hub, storing the fasteners in readiness for later wheel re-attachment or replacement, gripping and removing the wheel, examining the wheel for damage, tread life or balance, testing and regulating tire pressure, etc. There may be many different types, makes and models of vehicle with a corresponding variety of vehicle and wheel widths, diameters and configurations. Currently, most wheel servicing actions are performed manually by a mechanic at a garage service bay, roadside or elsewhere. It is expensive and often inconvenient to have wheel servicing that is as manually intensive as current servicing practices.

U.S. patent application Ser. No. 16/104,792 describes automatic screw fastener engaging/disengaging apparatus suitable for attaching/detaching wheels to/from vehicles. Removing and attaching screw fasteners such as lug nuts is but one facet of automatically changing a wheel. It would be valuable to have other wheel servicing performed automatically and to obviate, significantly or totally, manual intervention and labour other than setting up initial control.

SUMMARY OF THE INVENTION

According to an aspect of the invention, there is provided a robot tool comprising a gripping system having an array of at least three gripping units spaced about and defining a system operational axis, a first drive sub-system operable to angularly reorientate the array so as to reorientate the operational axis and to translationally move the array so as to translationally move the operational axis, a second drive sub-system for driving the gripping units in a direction parallel to the operational axis, a third drive sub-system for driving the gripping units in directions perpendicular to the operational axis, a first array of sensors spaced about the operational axis for sensing, along respective axes parallel to the operational axis, the positions of respective sidewall surface parts of a wheel located adjacent the robot tool, a second array of sensors spaced about the operational axis for sensing the position of respective tread surface parts of the wheel along respective directions perpendicular to the operational axis, a control having inputs from the sensors of the first and second arrays and outputs responsive to the inputs to effect operation of the drive sub-systems to align the operational axis with a rotational axis of the wheel, move the gripping units parallel to the operational axis to positions adjacent the wheel tread surface, and to move the gripping units perpendicularly to the operational axis to contact and grip the wheel tread surface.

The chassis can have rollers for supporting the chassis on a support surface, respective first and second roller drives for driving first and second ones of the rollers about generally horizontal axes, whereby to alter the location of the operational axis. Preferably, the roller drives are independent and permit different rotational speed and different rotational direction as between the first and second rollers. Preferably, the chassis has third and fourth roller drives to independently angularly rotate the respective first and second rollers about vertical axes to alter drive directions of the first and second rollers.

The robot tool can further comprise a tool support plate above and connected to the chassis by a linkage, the tool support plate supporting the wheel servicing sub-system, and a drive for adjusting the linkage to alter spacing of the tool support plate from the chassis, thereby to alter the location of the operational axis. The robot tool can further comprise a drive for altering the orientation of the tool support plate relative to the chassis, thereby to alter the location of the operational axis.

One of the wheel servicing sub-systems can be a fastener detaching/attaching sub-system for demounting/mounting a wheel at a vehicle hub such as that described in co-pending U.S. patent application, the fastener sub-system having sockets for holding removed fasteners in a circular array, the circle radius being adjustable.

One of the wheel servicing sub-systems can be a fastener storage sub-system for storing at the robot tool fasteners detached from a wheel when demounting the wheel from a vehicle and for retrieving from storage fasteners that are to be attached to corresponding fasteners on a vehicle hub when mounting a wheel to a vehicle. The storage sub-system can have several storage stations each with a circular array of storage seats for storing fasteners. The storage seats can have magnets for use in attracting fasteners from the sockets and for retaining the fasteners at the storage seats. The sockets can have corresponding magnets for attracting fasteners from the storage seats when the fasteners are to be retrieved from storage. At least one of the magnets can be an electromagnet which can be powered on or off to initiate fastener magnetic attraction, transfer and release.

One of the wheel servicing sub-systems can be a jacking sub-system for raising a part of a vehicle to enable any of access, removal, or mounting of a wheel to be serviced. Preferably, mounted on the robot tool are a plurality of independently deployable jacks, with each jack having a base for bearing against the ground and a vehicle support member for engagement with a vehicle jack point to bear at least part of the weight of the vehicle. Each such jack preferably has a drive for driving the vehicle support member upwardly from the base to lift said part of the vehicle weight. Preferably, each jack is mounted in an access mounting on the tool when in a standby position, the access mounting separable from the jack when the jack is pinned to the ground by vehicle weight and the chassis is moved away from the jack.

The wheel servicing sub-system can be a wheel mounting sub-system having at least three grippers deployable to grip an outer tread surface of a wheel to be serviced, the grippers located on a circle centered on the operational axis. Preferably, each of the grippers is mounted for radial movement away from and towards the operational axis. Preferably, each of the grippers is mounted for movement in a direction parallel to said operational axis. The gripper sub-system preferably has a first group of approach/distance sensors co-mounted with a gripper for sensing approach and distance to a tread surface of the tire. The gripper sub-system preferably has a second group of approach/distance sensors associated with a gripper for sensing approach and distance to a gripped wheel tire outer sidewall. Preferably, the grippers have cameras co-mounted with the grippers for inspecting at least one of a tire outer sidewall, a tire tread surface and an exterior side of a wheel rim as the wheel is rotated about the operational axis. Preferably the wheel mounting sub-system has a camera mounted on an articulating arm co-mounted on one of the grippers and manipulatable into a position to view a tire inner sidewall as the wheel is rotated about the operational axis. Preferably, each of the grippers has one or more rollers rotatable on a respective shaft to permit rotation of a gripped wheel. One or more of the grippers can have a drive to one of its rollers to rotate the roller about its axis, thereby to rotate the gripped wheel in counter-rotation about the operational axis.

The wheel servicing sub-system can be a tire pressure sub-system for testing and regulating tire pressure of the wheel. Preferably, the tire pressure measuring and regulating sub-system has the interface part thereof mounted on a support frame, the support frame mounted for rotation about the operational axis. The tire pressure sub-system preferably has a tire pressure measuring unit adapted for engagement with a wheel injection valve and operable to measure tire pressure. Preferably a tire pressure regulating unit adapted for engagement with a wheel injection valve for pumping and releasing air tire pressure is co-mounted with the tire pressure measuring unit. Preferably a valve cap removing/applying unit is adapted for engagement with a wheel injection valve for gripping and unscrewing a valve cap from a wheel injection valve and for placing and screwing down a valve cap onto a wheel injection valve. The or each unit can be mounted by a mounting mechanism on a frame supported by the carriage. Preferably the mounting mechanism includes rotary and translational drives operable to bring the or each unit to the injection valve and to maneuver the or each unit into engagement with an injection valve collar.

One of the wheel servicing sub-systems can be an automatic wheel balancing sub-system having a cone and drum system for automatic clamping therebetween the rim of a gripped wheel so as to allow free rotation of the wheel about its central axis when the grippers are withdrawn from the wheel tire. The balancer can have a vibration monitoring system for monitoring x, y and/or z vibrational artefacts and for relating them to a rotation position of the wheel.

The wheel balancing sub-system can have one or more supplementary mechanisms mounted on one or more articulated arms. One of the supplementary mechanisms can be a mechanism operable to automatically remove old balance weights from the wheel rim. One of the supplementary mechanisms can be a mechanism operable to automatically spray and clean a site intended for placement of a new balance weight. One of the supplementary mechanisms can be a mechanism operable to automatically guide and attach a new balance weight to the wheel rim at a site intended for placement thereof. One of the supplementary mechanisms can be a mechanism operable to automatically remove and store a wheel cap. One of the supplementary mechanisms can be a mechanism operable automatically to remove and store gravel and like foreign bodies from the tire tread.

It is of significant merit that several of the wheel servicing sub-systems have operational axes that are coincident with an overall operational axis of the robot tool. One disadvantage of having several wheel servicing sub-systems having coincident operational axes is that components and units of one wheel servicing sub-system can block or interfere with components and units of another wheel servicing sub-system. According to an aspect of the invention, a component or unit of one wheel servicing sub-system is mounted on the tool so as to permit movement thereof to a 'parking' position so as to avoid blockage or interference with components and units of another wheel servicing sub-system upon deployment of the other wheel servicing sub-system.

BRIEF DESCRIPTION OF THE DRAWINGS

For simplicity and clarity of illustration, elements illustrated in the accompanying figure are not drawn to common scale. For example, the dimensions of some of the elements are exaggerated relative to other elements for clarity. Advantages, features and characteristics of the present invention, as well as methods, operation and functions of related elements of structure, and the combinations of parts and economies of manufacture, will become apparent upon consideration of the following description and claims with reference to the accompanying drawings, all of which form a part of the specification, wherein like reference numerals designate corresponding parts in the various figures, and wherein:

FIG. 5 is a top perspective view from the front and the other side of a chassis sub-system of the robot tool of FIG. 1 according to an embodiment of the invention.

FIG. 6 is a bottom perspective view from the back and the other side of the chassis sub-system of FIG. 5.

FIG. 7 is a top perspective view from the back and the other side of a tool support arrangement of the robot tool of FIG. 1 according to an embodiment of the invention.

FIG. 8 is an exploded view of the robot support arrangement of FIG. 7.

FIG. 9 is a side view of the tool support arrangement of FIG. 7 in one articulation.

FIG. 10 is a side view of the tool support arrangement of FIG. 7 in a second articulation.

FIG. 11 is a side view of the tool support arrangement of FIG. 7 in a third articulation.

FIG. 12 is a side view of the tool support arrangement of FIG. 7 in a fourth articulation.

FIG. 44 is an exploded perspective view showing part of a pressure plate assembly for the wheel balancing sub-system of FIG. 36.

FIG. 45 is an exploded perspective view showing part of a cone assembly for the wheel balancing sub-system of FIG. 36.

FIG. 46 is a perspective view of a cap remover according to an embodiment of the invention, the cap remover forming part of the wheel balancing sub-system of FIG. 36 and being shown in a preparatory phase of operation.

FIG. 47 is a perspective view corresponding to FIG. 46 with the cap remover shown in a later phase of operation.

Figure 1:
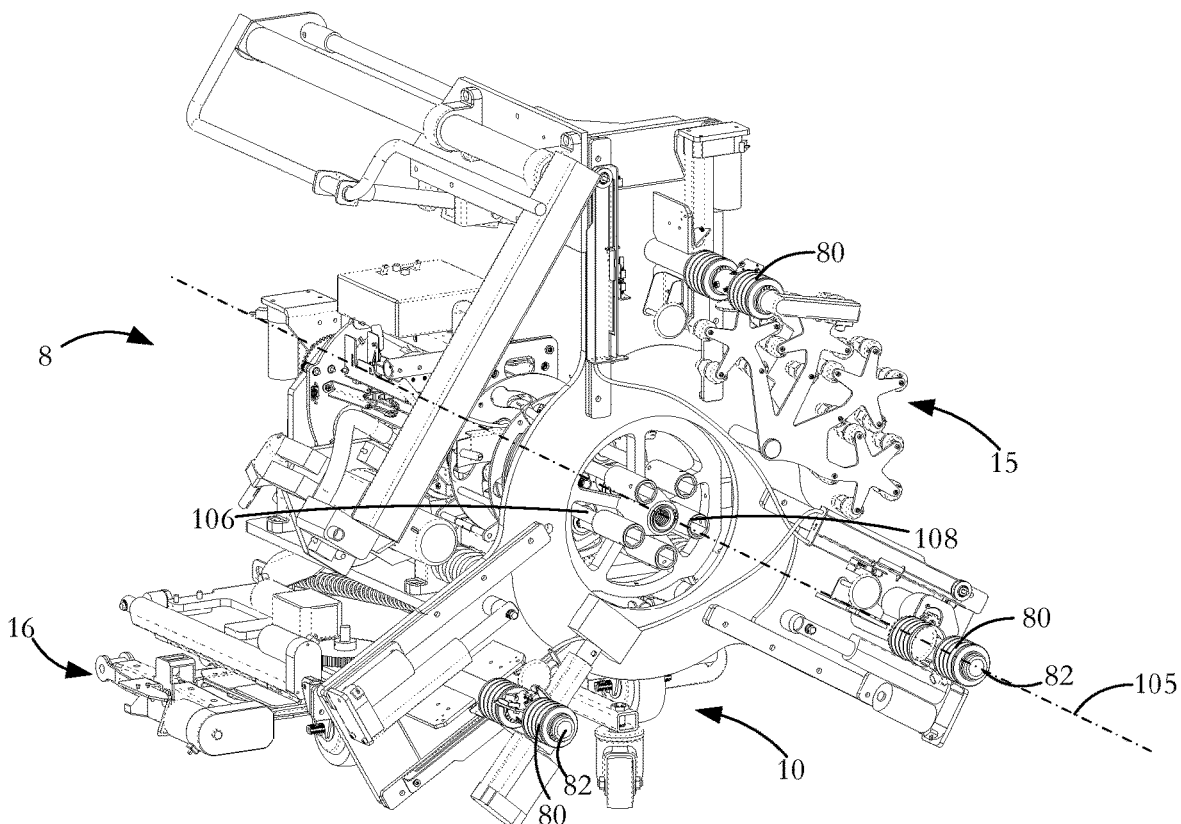
FIG. 1 is a perspective view from the front of a robot wheel servicing tool according to an embodiment of the invention.
Figure 2:
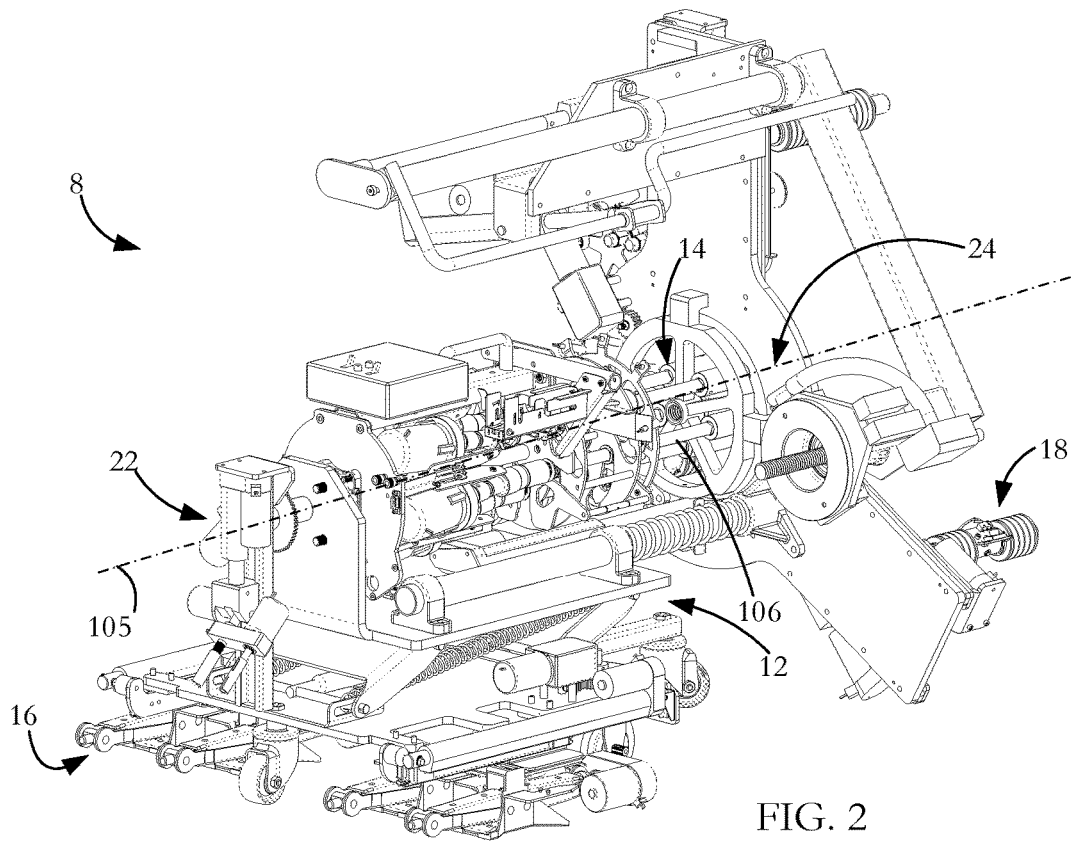
FIG. 2 is a perspective view from the rear of the robot tool of FIG. 1.
Figure 3:
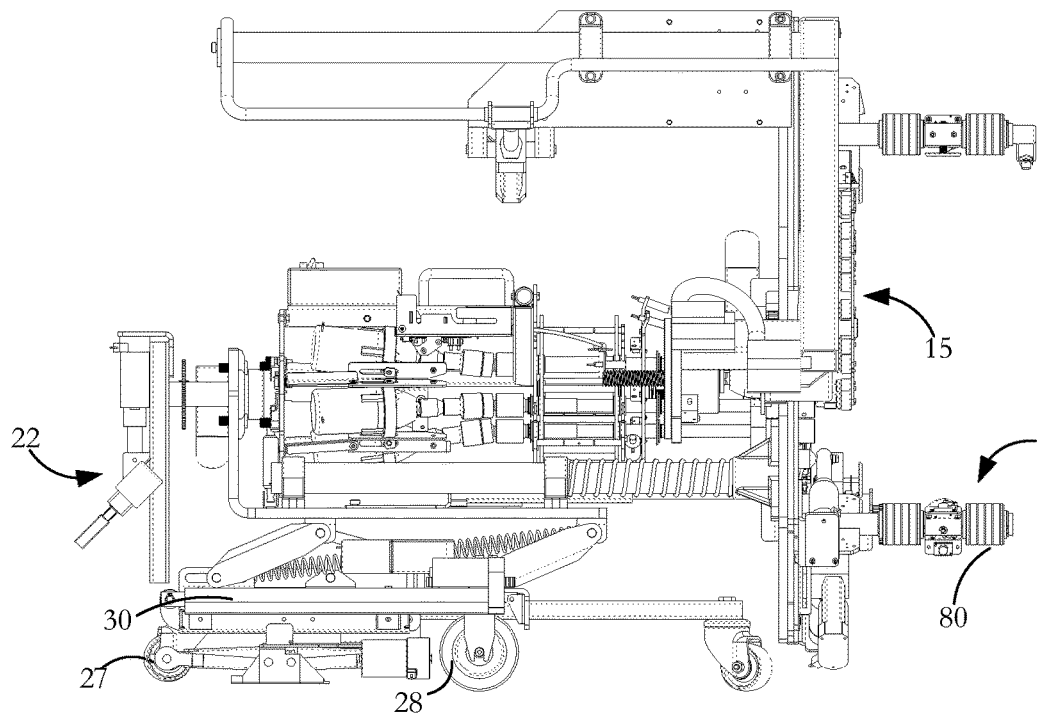
FIG. 3 is a view from one side of the robot tool of FIG. 1.
Figure 4:
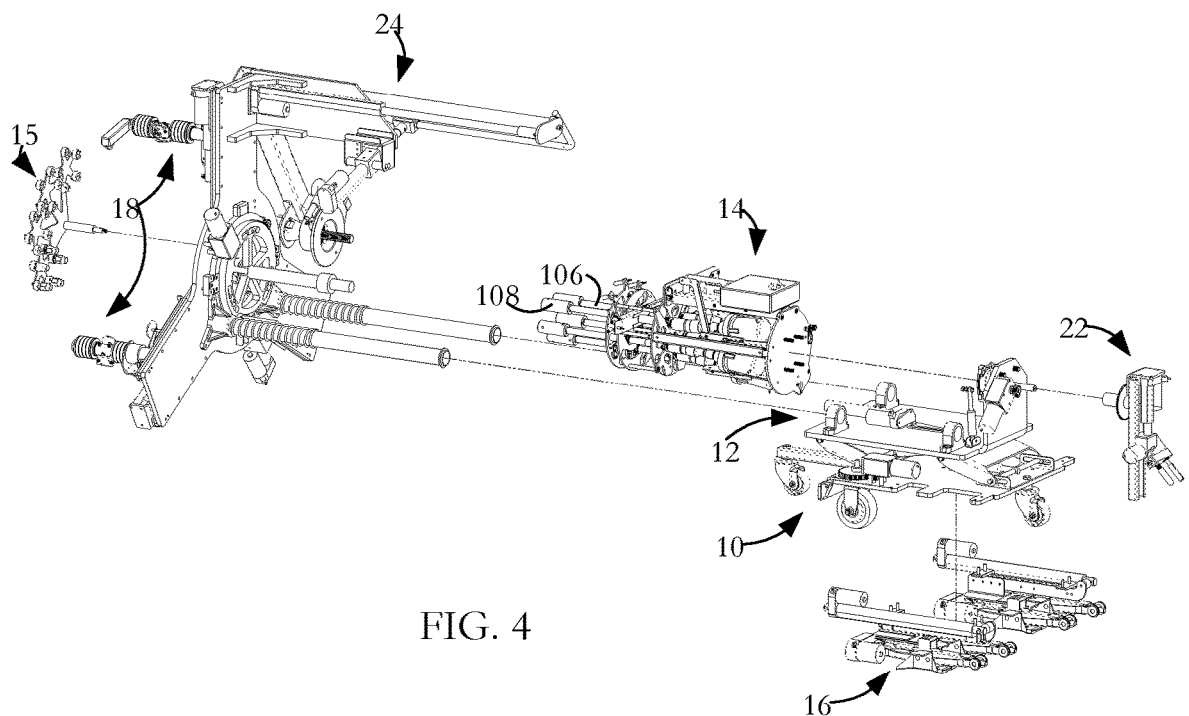
FIG. 4 is an exploded perspective view of the robot tool of FIG. 1.
Figure 13:
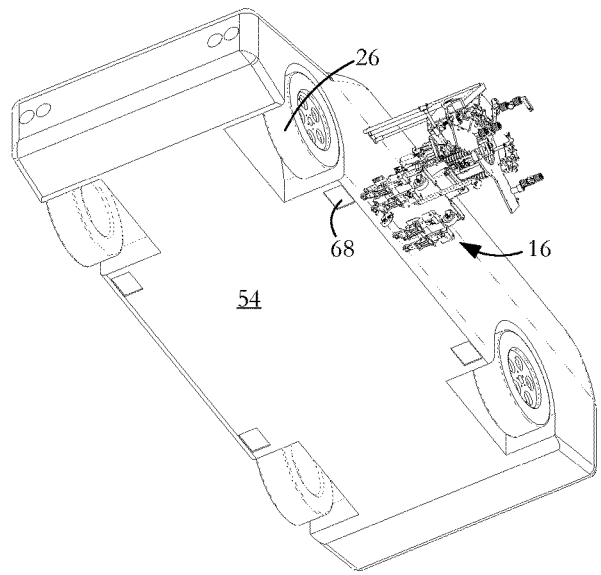
FIG. 13 is a bottom perspective view from the front and one side of the robot tool of FIG. 1 showing a jacking sub-system of the robot tool according to an embodiment of the invention.
Figure 14:
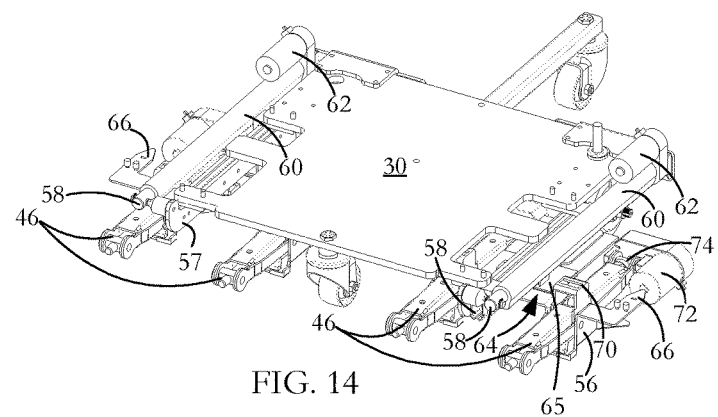
FIG. 14 is a top perspective view from the top and one side of the jacking sub-system illustrated in FIG. 13.
Figure 15:
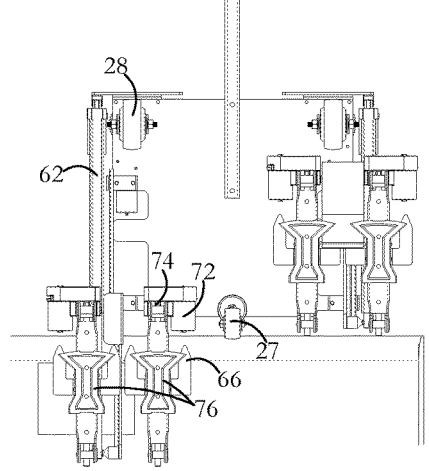
FIG. 15 is a bottom view of the jacking sub-system illustrated in FIG. 13.

DETAILED DESCRIPTION OF THE INVENTION INCLUDING THE PRESENTLY PREFERRED EMBODIMENTS

Referring to FIGS. 1, 2, 3 and 4, a robot tool 8 for servicing a vehicle wheel has several wheel servicing sub-systems as follows:
 a chassis sub-system 10;
 a tool support sub-system 12;
 a fastener detaching/attaching sub-system 14;
 a fastener storage sub-system 15;
 a jacking sub-system 16;
 a gripper sub-system 18;
 a tire inspection sub-system 20;
 a tire pressure sub-system 22;
 a wheel balancing sub-system 24.

Each of the wheel servicing sub-systems has one or more interface parts which under a system control is automatically engageable with corresponding wheel interface parts, these engagements permitting automatic operation of the respective wheel servicing sub-system to service the vehicle wheel. In one embodiment of the invention, when a vehicle wheel requires servicing, the following exemplary sequence of steps is undertaken.

Figure 48:
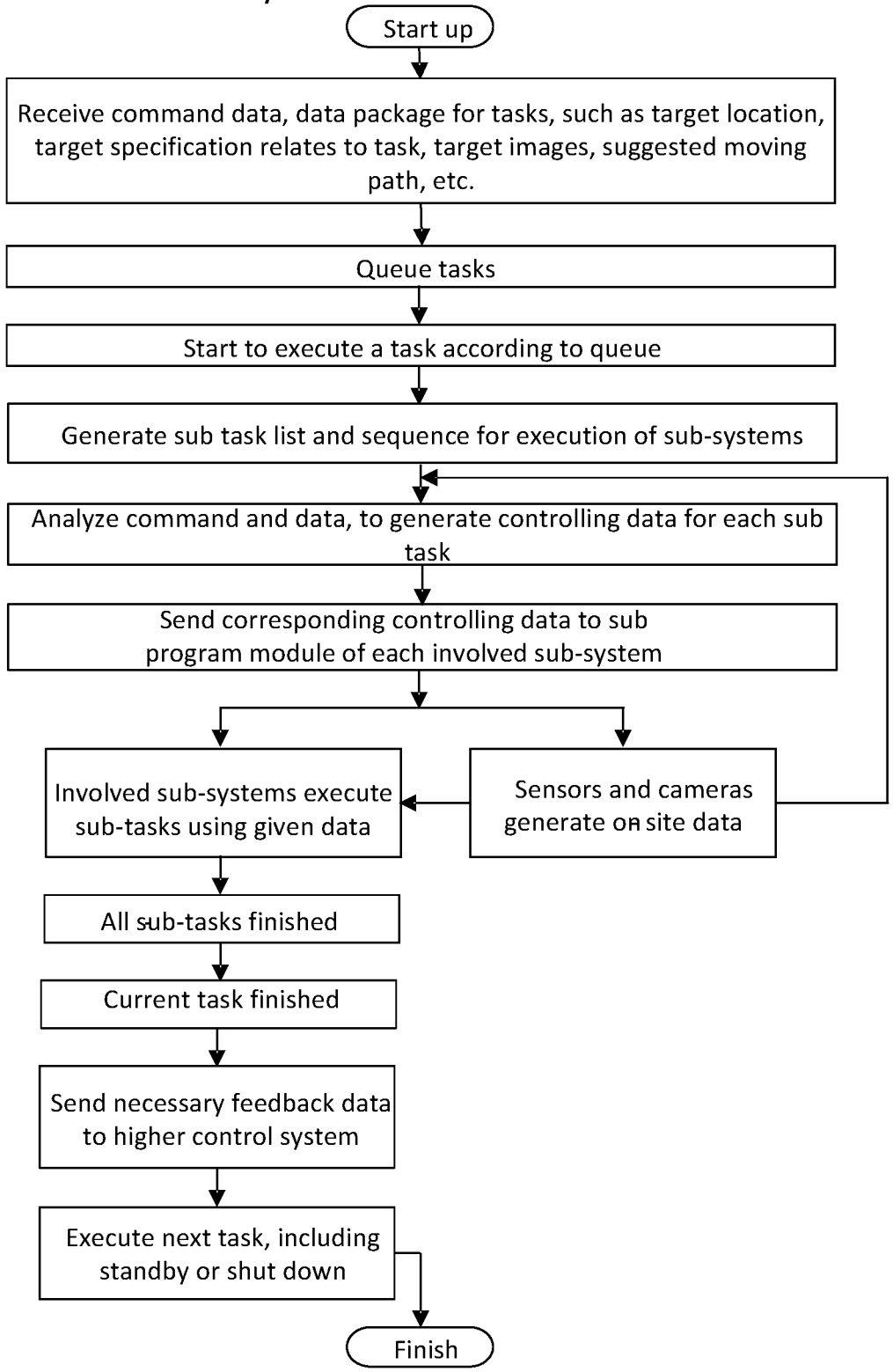
FIG. 48 is a schematic flow diagram of an overall control system for the robot tool according to an embodiment of the invention.

FIG. 48 is a schematic flow diagram of an overall control system for the robot tool according to an embodiment of the invention. As schematically depicted in FIG. 48, an on-board control system at the robot tool receives instructions identifying work to be done from a control center through a wireless network or other communication channel. Subsequently, all servicing operations are performed according to the received instructions without manual intervention other than to investigate issues which are reported 6 resulting either in updating to the instructions issued to the control system or a trouble shooting manual intervention. Initial instructions identify where the work is to be done, such as by identifying the location of the target vehicle (for example, as GPS coordinates) or by a route to the vehicle, providing data for the target vehicle (such as model, year, color, license plate number and shape, wheel service history, vehicle exterior, wheel dimension, torque standard) and providing associated images, such as those of the vehicle body, jack point positions, etc. Once within an autonomous operational range of the target vehicle, the robot tool moves to a position close to the target vehicle, according to a path identified in the instructions and/or a path calculated by the robot as modified/updated by images from its cameras as it moves under the control of a machine vision system. As the robot approaches the target vehicle, vehicle appearance characteristics are monitored and corresponding data is checked against data included in the instructions to confirm that the approached vehicle is indeed the target vehicle. According to the control center command, the robot controller develops a detailed job list and sequence; e.g., sequence of jack points to be lifted. Cameras at the robot work with the control system to identify the vehicle orientation and location of the wheel to be removed and the tool moves to the appropriate side of and position along the vehicle. As shown in FIG. 48, control outputs are issued from the control system to individual sub-systems as and when they are deployed. Typically, these include outputs to switches, motors and other actuators. As the sub-systems operate, outputs are sent from the sub-systems to the control system reporting on the progress of the sub-system operation. Typically, these include camera and sensor outputs which are processed in the control system. The control system includes a comprehensive machine vision sub-system whereby images of a wheel part being serviced and the sub-system doing the servicing are analyzed and used, either alone or in conjunction with other resource data, to effect real-time control adjustment to the sub-system. Cameras and their positions are not shown in the figures but it will be understood that they are mounted wherever expedient to do so.

Figure 49:
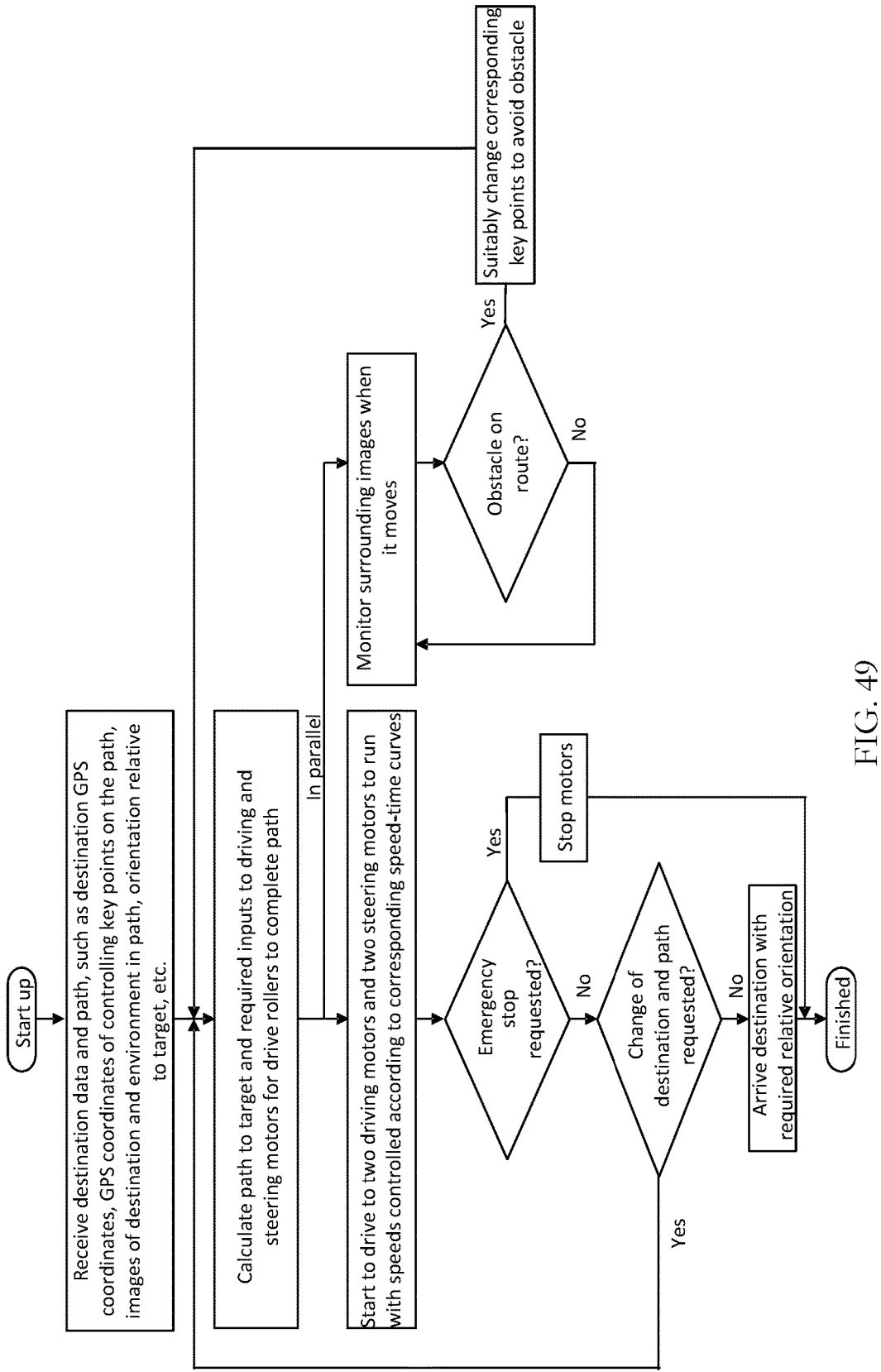
FIG. 49 is a schematic flow diagram of a carriage control module for the overall control system of FIG. 48, such module according to an embodiment of the invention.

Referring to FIGS. 5 and 6, primary movement of the robot tool 8 is by means of a wheeled chassis 10 which is adapted to move the robot tool on a supporting surface such as the ground. On-board chassis drives are coordinated to effect rectilinear, curvilinear and spin motion of the chassis on the supporting surface. A chassis frame 30 has four wheels or rollers 27, 28 mounted in a diamond array. Idler swivel wheels or casters 27 are mounted to the frame 30 at front and back corners of the array and drive wheels or rollers 28 are mounted to the frame 30 at opposed side corners of the array. Control to the drive wheels is used to orientate horizontal axes of rotation into any of a range of relationships, both parallel and non-parallel. The drive wheels are independently driven by motors 32 at the same or different speeds or rotary directions to move the tool in any of a range of directions and along any of a range of paths. The drive rollers 28 are also independently mounted on vertical axes and can be rotated independently to change the roller drive direction by rotary motors 34 to provide a further degree of freedom for independent movement of the drive wheels. The design allows translational movement in any direction parallel to the plane of the support surface, allows the robot tool to spin about any vertical axis, and allows any combination of these movements. This design provides for highly flexible and comprehensive translational and spin movements of the robot tool, which is valuable for operation in a confined space. The chassis 10, with its independently driven drive rollers 28, forms part of a first drive sub-system used to angularly reorientate and translationally move the gripper sub-system 18. FIG. 49 is a schematic flow diagram of a carriage control module.

Figure 50:
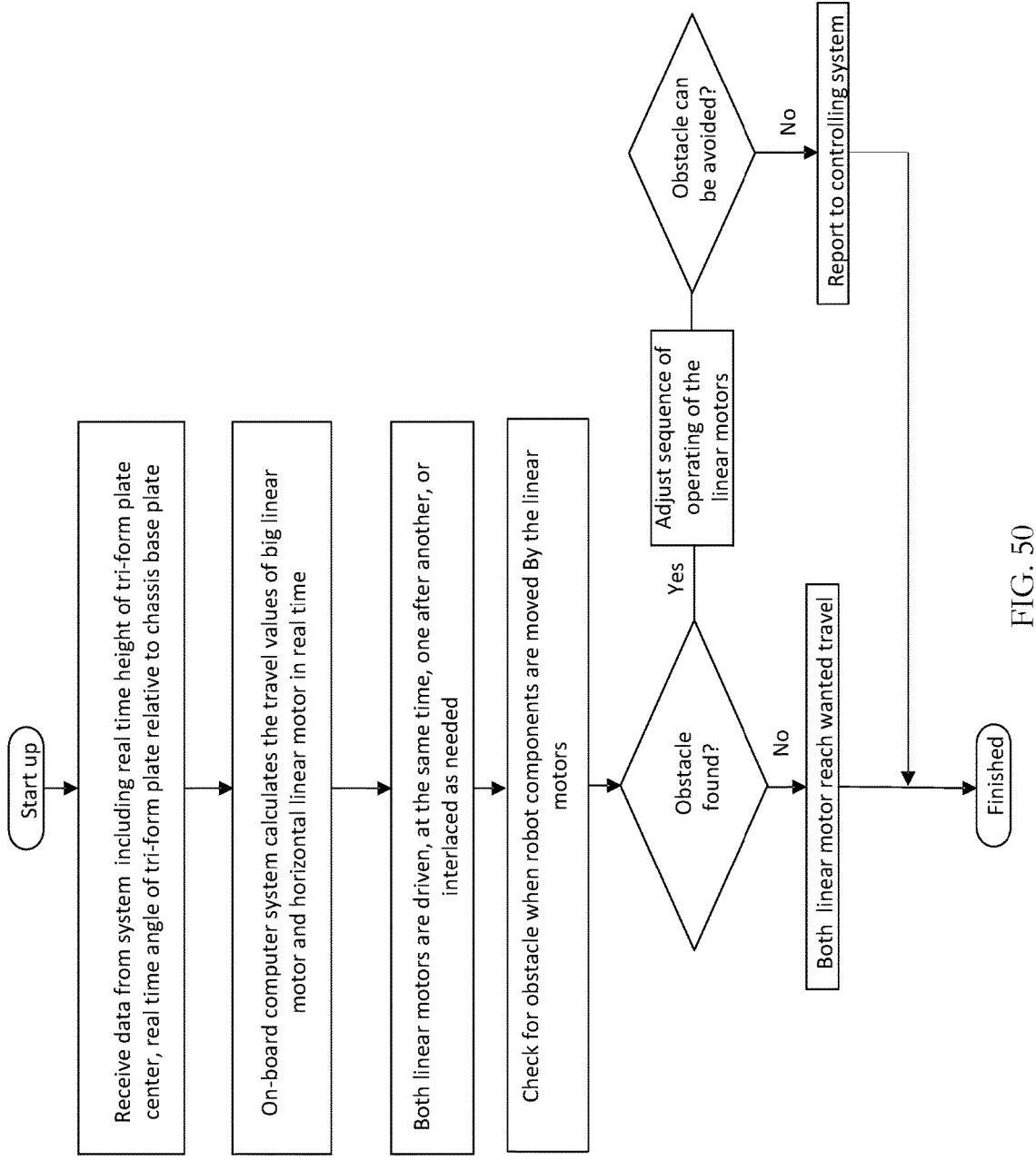
FIG. 50 is a schematic flow diagram of tool support control module for the overall control system of FIG. 48, such module according to an embodiment of the invention.

As shown in FIGS. 7 to 12, mounted on the wheeled chassis by means of front struts 36 and rear struts 38 is a tool support plate 40. Top and bottom ends of the struts 36, 38 are pivotally mounted at the support plate 40 and the chassis frame 30 respectively. The bottom ends of the rear struts 38 are slidably mounted in horizontal slots 42 on linear flanges 44 integral with the chassis frame 30, the flanges 44 extending parallel to a fore-aft chassis axis, A. Linear motors 46 are operable to move the bottom ends of strut 38 between stop positions along the slots 42. End of rod 48 of linear motor 50 is pivotally mounted to upper ends of the rear struts 38 and another end of the linear motor body 50 is pivotally mounted to lower ends of the front struts 36. Linear motor 50 is operable to alter the spacing between the rear strut upper ends and the front strut lower ends. Coordinated operation of the motors 46, 50 is used to raise, lower, forward tilt or backward tilt the support plate 40 and the supported tool sub-systems. As shown in FIGS. 9 to 12, operation of the motors 46, 50 is used to obtain, within a permitted range, any combination of height change and tilt of the support plate 40 in any desired sequence of height adjustment and tilt change increments. The tool support plate 40 together with motors 46, 50 forms another part of the first drive sub-system used to angularly reorientate and translationally move the gripper sub-system 18. The sequencing is important in view of the compact arrangement of the wheel servicing sub-systems and the need to control movement of the tool and its sub-systems without blockage or collision between sub-system components. A particular combination of tilt angle θ and height H corresponds to a combination of a displacement L1 of motor 46 and a displacement L2 of motor 50. For required values of θ, H, the control system calculates the corresponding values of L1 and L2 and sets displacement of the motors either in a one-time coordinated activation, or in a sequence of activation steps. The primary functional requirement for the tool support sub-system is to enable height change of the front end of the fastener sub-system while enabling tilt through a range of angles at any height in such a way that the front of the fastener sub-system is suitably positioned in front of the chassis such that the gripper sub-system is not blocked by the chassis. The lift and tilt function can be attained by variations of the illustrated mechanism such as, for example one or more vertical linear motors with bottoms of the linear motors attached to the chassis frame and driven rods pivotally and slidably mounted to the underside of the support plate. These and any other linear or rotary drives used in the robot tool can be equipped to measure displacement for use in subsequent control. Alternatively, or in addition, a height and tilt measuring mechanism can be mounted on the support plate. FIG. 50 is a schematic flow diagram of tool support control module.

As shown in FIGS. 13 to 18, suspended from the back of the chassis frame 30 is a jacking sub-system 16 comprising four jacks 52, each of which is independently deployable for lifting a part of a vehicle 54. A pair of jacks 52 is carried in each of a pair of docking stations 56. Each docking station 56 is mounted on a slidable member 57 which is mounted to a slide suspension member 58 attached to the carriage. The slide arrangement is such that each of the docking stations 56 can be driven out from the carriage in a direction parallel to the operational axis and then returned to the carriage. For this purpose, a linear motor 62 has its actuating rod 61 attached to the slidable member and sliding in motor barrel 60. Each carriage has housings 64 each of which can receive a pointed blade 66 on the jack 52 whereby a jack is mounted on the docking station in standby mode but can be separated out of its housing 64 when deployed. The housings have upper and lower guidance tabs 65 to guide a pointed blade 66 into a housing 64.

When a particular jack 52 is to be deployed to lift a vehicle 54, the mobile chassis 10 is turned so that the docking stations 56 face towards the vehicle 54. On the basis of control system review of vehicle body jack point position data, the chassis position is adjusted to bring an available one of the jacks 53 roughly abreast of the expected position of a target vehicle jack point 68. On-board cameras generate images of the vehicle underside and these are analyzed working with the machine vision system to identify the exact position of the target jack point 68. In one embodiment of the jacking sub-system 16, for example, cameras are located at front, rear, left and right corners of the chassis frame 30, at the docking stations 56 and at each jack 52, with point laser light sources being located at the center of each jack lifting head 70.

Figure 16:
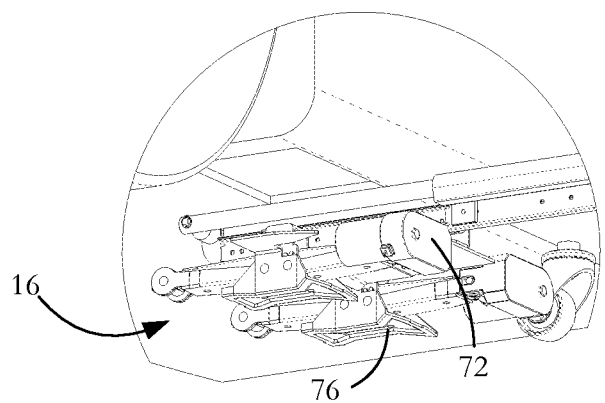
FIG. 16 is a scrap perspective view of the jacking sub-system of FIG. 13 showing one stage in deployment thereof.
Figure 17:
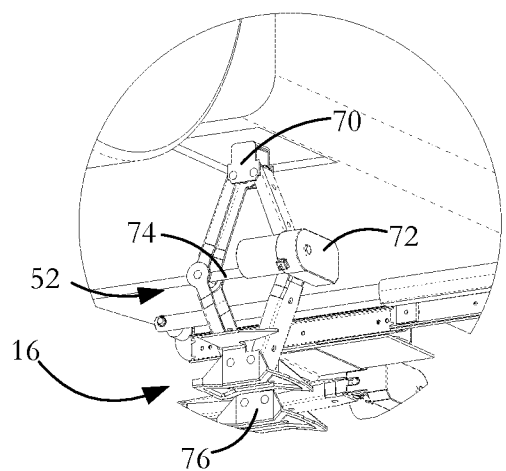
FIG. 17 is a scrap perspective view corresponding to the view of FIG. 16 but showing a subsequent stage in deployment thereof.
Figure 18:
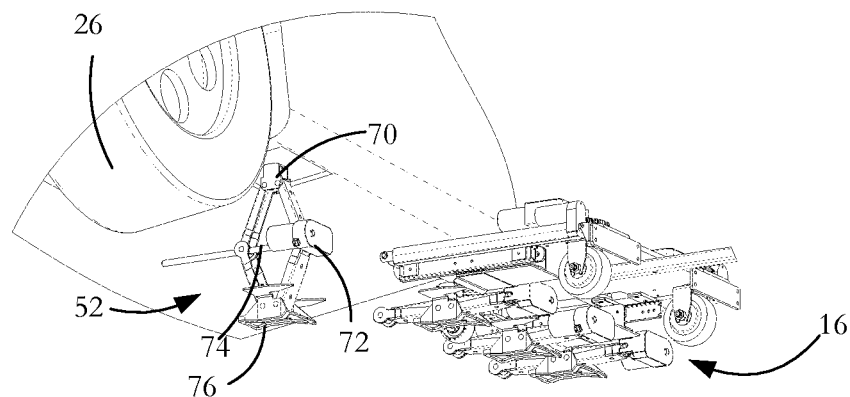
FIG. 18 is a scrap perspective view corresponding to the view of FIG. 17 but showing a later stage in deployment thereof.

In a coordinated operation, the linear motor of the selected docking station 56 is operated to slide the docking station 56 out from the carriage so that the jack lifting head 70 of the selected jack is moved directly under the target vehicle jack point (FIG. 16). Rotary mmotor 72 on the deployed jack 52 is then operated to turn screw drive 74 so as to provide a scissors lifting action to the positioned jack to raise the jack lifting head to engage and lift the overlying vehicle part (FIG. 17). After the vehicle part is lifted, part of the vehicle weight is supported by the deployed jack with the jack base pressed against the ground or other support surface. The robot tool 8 is disconnected from the deployed jack 52 simply by driving the chassis 10 rearwardly away from the vehicle 54 so that the pointed blade 66 slides out of the associated housing 64 on the docking station (FIG. 18). The mobile chassis 10 can then be driven to a position near another vehicle jack point either on the same side of the vehicle or on its other side where a second jack 52 can be deployed in the same way. To retrieve a jack from the vehicle and to remount it on the robot tool when a particular service phase is complete, a reverse sequence is adopted.

Figure 51:
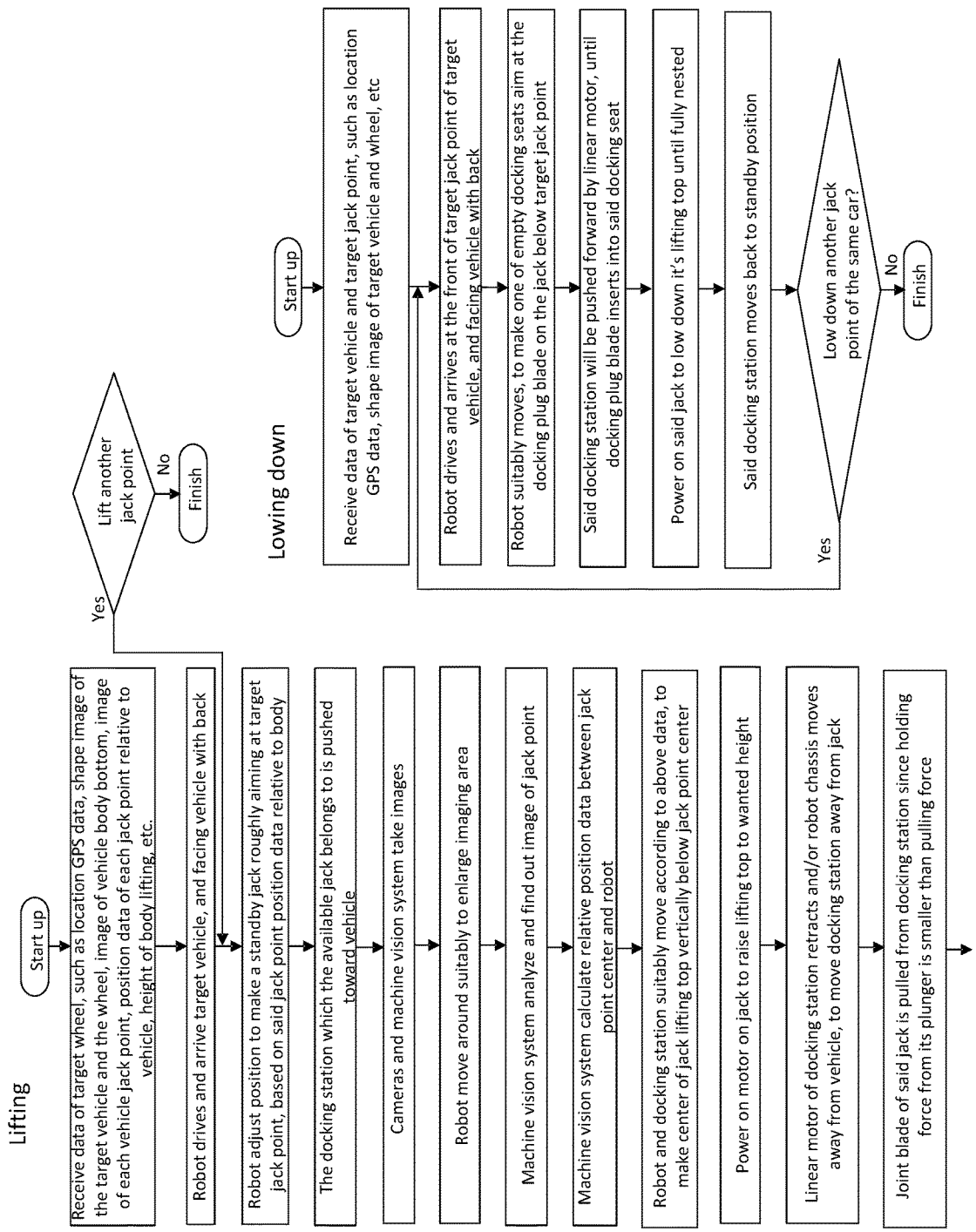
FIG. 51 is a schematic flow diagram of vehicle lifting control module for the overall control system of FIG. 48, such module according to an embodiment of the invention.

To lift the vehicle for wheel removal, the robot moves to a suitable position beside the closest vehicle jack point and turns so that the back of the tool faces towards the vehicle. One of the two docking stations 56 is then slid along the slide suspension member 58 towards the vehicle 54. Cameras on the docking station 56 and jacks 52 scan images of the vehicle underside as the jacks 52 approach an operable position. The machine vision system checks the scanned images against stored images of the desired jack point, and adjusts the selected jack position as needed until a match is found. Movements of the wheeled chassis and the docking station 56 are coordinated to bring the support plate of one of the jacks into vertical alignment with the center of a vehicle jack point. Vertical alignment is determined by coincidence of a laser point directed upwardly from a laser source located at the jack center to a vehicle jack point. Jack motor is then powered on to lift the overlying part of the vehicle to a height determined in the instructions and monitored by the extent of scissors movement of the jack. Cameras monitor clearance between the treaded wheel surface and ground or other support surface. Once the vehicle is lifted to a desired height so that the required clearance between vehicle and ground exists, the jack motor is powered off. The docking station drive and the chassis drive wheels then operate to retract the docking station 56 and to roll the tool away from the vehicle. Because the deployed jack supports the vehicle, the bottom of the jack is pressed hard against the ground so that, as the robot tool rolls back, blade 66 slides out of the docking station housing 64. According to the control instructions, any one or more of the remaining jacks is deployed to lift the vehicle at another jack point or the tool is moved to another site to lift another vehicle. The robot tool is now ready for its next servicing task. In an alternative sequence a machine vision system directly calculates the coordinates of target vehicle jack point relative to the robot tool and the tool is maneuvered to bring the jack lifting head to a target jack point. Once replacement or other servicing of the wheel is completed, the jack is removed by substantially reversing the above sequence of steps. FIG. 51 is a schematic flow diagram of vehicle lifting control module for the overall control system of FIG. 48, such module according to an embodiment of the invention.

There are a number of servicing actions that can be performed on a wheel while it remains mounted on a vehicle. If an on-vehicle service action cannot be performed, the robot tool removes the wheel from the vehicle hub to prepare for servicing by using a fastener engaging/disengaging sub-system ("fastener unit") such as that disclosed in co-pending U.S. patent application Ser. No. 16/104,792. When a vehicle is lifted and a wheel leaves the ground, the wheel may free to rotate, or may be fixed against rotation by the vehicle transmission unit or parking brake. This can be identified from received vehicle data. In a variation of the jack procedure for a vehicle having a freely rotatable wheel, lifting and lowering are interrupted at a point where the jack lifting head and the vehicle jack point are engaged and sufficient residual weight is borne by the support surface that fasteners clamping the wheel to the hub can be preliminarily untightened (wheel detachment) or tightened (wheel attachment) without spinning the wheel. Once preliminarily untightened or tightened, the jack raising or lowering procedure continues. In other circumstances, a wheel may be detected to be sufficiently braked or otherwise prevented from turning that no interruption in the jacking procedure is necessary.

Figure 19:
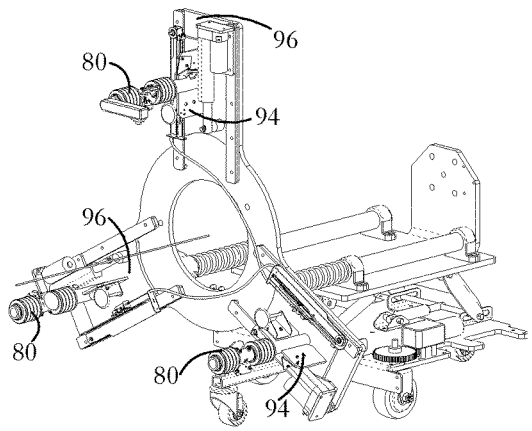
FIG. 19 is a top perspective view from the front and one side of a part of the robot tool of FIG. 1 showing a gripper sub-system according to an embodiment of the invention.
Figure 43:
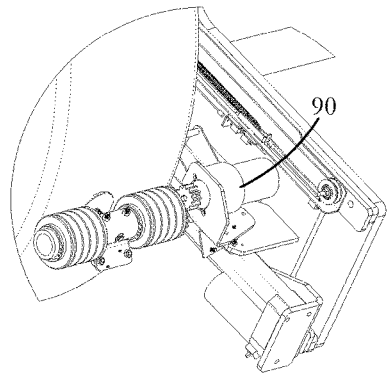
FIG. 43 is a scrap perspective view showing the use of a gripper to rotate a wheel.
Figure 20:
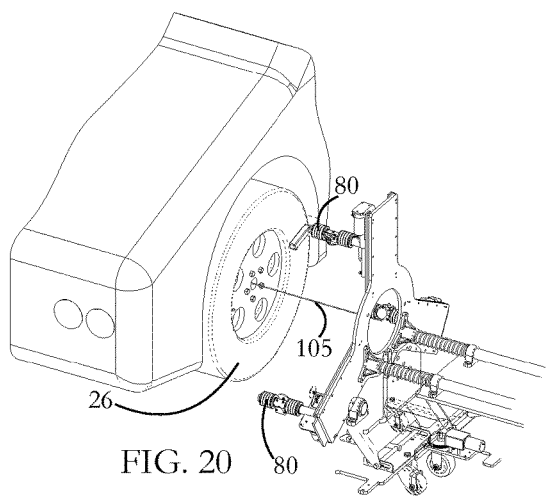
FIG. 20 is a top perspective view from the back and one side showing the gripper sub-system of FIG. 19 at a stage in deployment thereof.

After a vehicle is raised by a jack to lift a wheel off the ground or other support surface, the wheel is removed and either serviced and remounted or taken away and replaced by a previously serviced, spare or new wheel. In both cases, as shown in FIGS. 19 to 23, the wheel 26 is automatically gripped by the gripper sub-system in preparation for removal. As shown in FIGS. 19 and 20, three grippers 78 are mounted in an equispaced, circular array at the front of the robot tool. Each gripper has a pair of cylindrical rollers 80 coaxially mounted on a shaft 82 extending generally parallel to the tool operational axis. More than one roller 80 is used at each gripper 78 in order better to match or conform the gripper to the outer tread surface 84 of tire 26. Depending on original design and wear, the section of the tread surface 84 may be curved or one side of the tread surface may be more worn than the other side. By using two or more rollers 80, contact is improved. In other alternatives, the two rollers are cone-shaped with a small taper angle or the rollers are mounted with a flexible connection between them allowing the rollers to have rotational axes that are not completely aligned. In each of the multi-roller gripping units previously described, first and second rollers are mounted with respective axes of rotation within a common plane containing the robot tool operational axis. In operation, the rollers are moved to bear against the wheel tread surface at respective regions of the surface which are intersected by the common plane and which are adjacent to one another. The rollers have a surface layer of resilient material to enhance the grip interface between the grippers 78 and the tire tread surface 84. As shown in FIG. 43, a roller 80 on least one of the grippers is connected to rotary motor 90 which, when needed, is driven to rotate the connected roller on that gripper 78 resulting in counter-rotation of the gripped wheel 26. As will be described presently, the wheel can be rotated slowly to enable tire inspection and related servicing or can be driven at higher speed in the course of assessing and correcting wheel imbalance.

Figure 52:
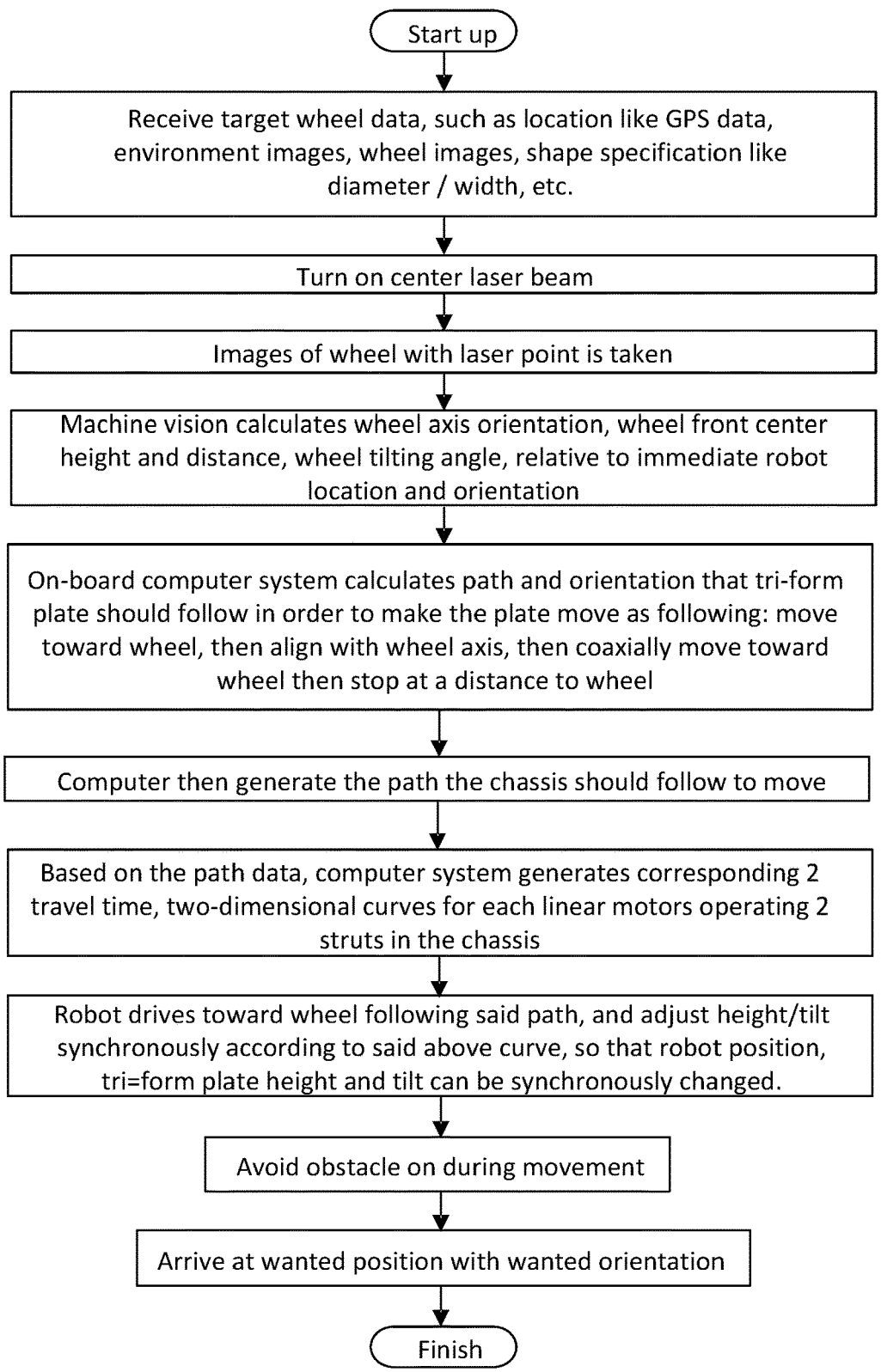
FIG. 52 is a schematic flow diagram of a wheel alignment and access control module for the overall control system of FIG. 48, such module according to an embodiment of the invention.

One end of each shaft 82 is fixed to a respective carriage 92 having shaft-supporting flanges or fins 94. Each carriage 92 is mounted for radial reciprocal sliding movement along respective frames 96 mounted on spokes of a tri-form plate 98. Each of the three carriages 92 is independently driven by respective linear motors 100 to move the grippers 78 in a coordinated manner to increase or decrease the radius of their circular array. The circle radius is increased so that a wheel 26 can be accommodated inside the circular array and is reduced to move grippers 78 against the tire tread surface 84 to grip the tire 86. In one embodiment, the three linear motors 100 have internal displacement sensors and the three grippers 78 are moved independently to grip the wheel 26 with displacement from a coordinated start positions being measured by the sensors. The control system calculates the wheel axis position and then adjusts the position of the tool operational axis to obtain alignment. In an alternative embodiment in which the linear motors lack internal displacement sensors, Bowden cables are used to implement a 'compare' function. Two of the three carriages are subordinate and are connected to the 'main' carriage by the cables. Movement of the cables transmits the subordinate carriage displacements to a comparator device at the main carriage where the three displacements are compared. If one displacement lags, drive to the other two carriages is stopped until the displacements are equalized. In this way, the circular array of grippers is incrementally adjusted to maintain the center of the array in coaxial alignment with the tool operational axis. FIG. 52 is a schematic flow diagram of a wheel alignment and access control module.

Figures 22, 23:
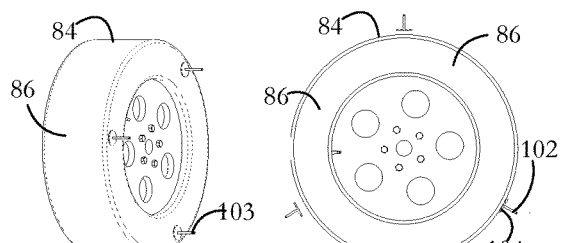
FIG. 22 is a perspective view from the front and one side of a wheel showing use of a first set of sensors for positioning the gripper sub-system of FIG. 19 on a wheel.
FIG. 23 is a side view of a wheel showing use of a second set of sensors for positioning the gripper sub-system of FIG. 19 on a wheel.
Figure 23A:
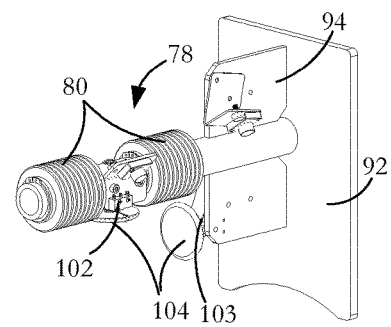
FIG. 23A is a scrap perspective view showing one embodiment of gripper for use in the gripper sub-system of FIG. 19.
Figure 24:
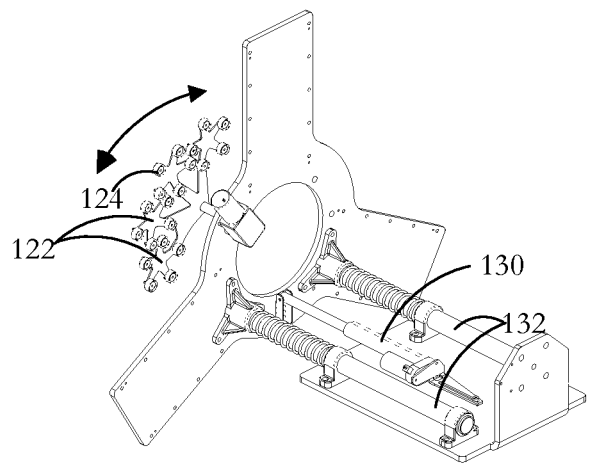
FIG. 24 is a top perspective view from the back and one side of a part of the robot tool of FIG. 1 showing a fastener storage sub-system according to an embodiment of the invention.
Figure 25:
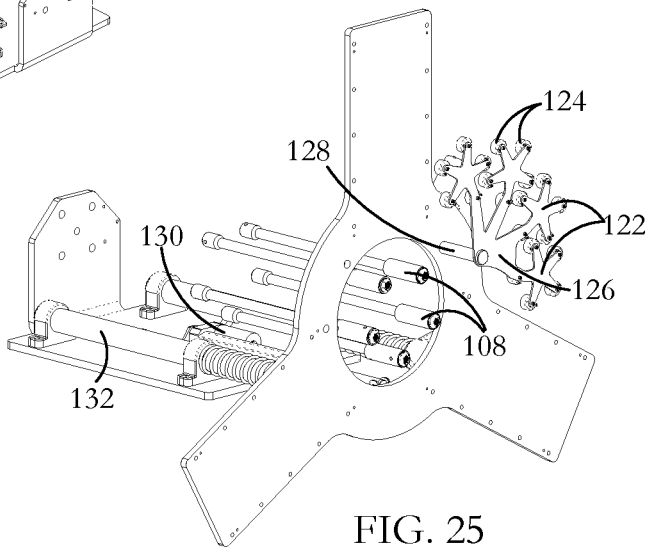
FIG. 25 is a top perspective view from the front and one side showing the fastener storage sub-system of FIG. 24.

As shown in FIGS. 23 and 23A, tread surface contact sensors 102 mounted between rollers 80 of each gripper 78 are used to monitor the direction of any offset of the wheel center axis relative to the tool operational axis. If, in the course of radially inward movement of sensor pads 104, only one tread surface contact sensor 102 is activated, this means that the wheel 26 is closer to the associated gripper 78 than to the other two grippers. In response, the control system moves the operational axis to equalize spacing of the grippers 78 from the tread surface 84 while progressively moving the grippers 78 towards the tread surface 84 to effect gripping. If there were direct contact between the head of a sensor 102 and the tire 86 of a spinning wheel, the sensor 102 could be damaged. Sensor pad 104, while absorbing the dynamic impact of a spinning wheel, triggers the tread surface contact sensor 102 when contact between the pad and the wheel surface 84 is made. Similar sensors 103 and transfer pads 104 are mounted on gripper carriage 92 and a similar method is used as the gripper sub-system is moved towards the tire outside sidewall as shown in FIG. 22. Tire sidewall sensors 103 are activated by the approach and contact of the tool to the sidewall when contact is established at sidewall sensor pads, the contact being such as to trigger the tire sidewall contact sensor when contact between the sidewall transfer pads and the wheel sidewall is made. In fact, the tire sidewall maneuver is performed before the tire tread surface maneuver. This incremental approach technique and analysis can alternatively be monitored using other types of sensor such as touchless (optical, ultrasonic, etc.) approach and distance sensors.

Figure 21:
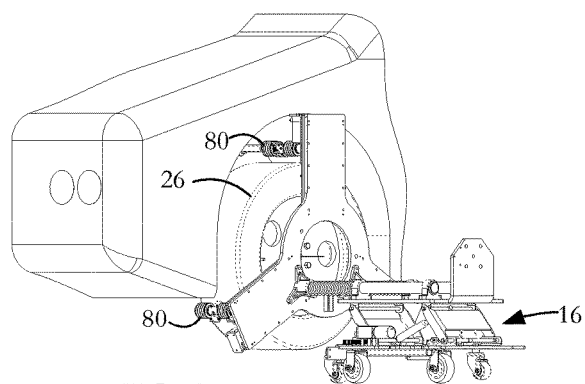
FIG. 21 is a side perspective view from the back and one side showing the gripper sub-system of FIG. 20 at a later stage in deployment thereof.

In operation (FIG. 20) the robot tool drives to a set-up position in front of the target wheel 26 and projects a centering laser beam 105 along the operational axis to the wheel. At the same time, the machine vision system analyzes an image of the wheel and laser point and calculates the center offset between the laser point and the wheel center and calculates also the difference in inclination between the wheel axis and the operational axis. This is used to calculate an approach path and orientation of tri-form plate 98. Corresponding drives to the chassis and support plate are applied to move the tri-form plate 98 towards the wheel align and to align the tool operational axis with the wheel axis. As shown in FIG. 21, as the gripper assembly slides closer to the wheel, the grippers are moved radially as deemed necessary from the machine vision system interpreting wheel and vehicle body stored and image data to allow the grippers to be inserted into the cavity between the wheel and the vehicle body. A similar sequence can be used to approach and grip a wheel that is not vehicle mounted such as a new wheel stacked in a dispensing arrangement. As shown in FIG. 21, according to the offset and inclination differences between the robot operational axis and the wheel axis, corrections in tool operational axis position and inclination are made to obtain a rough alignment of the tool operational axis with the wheel axis.

Figure 53:
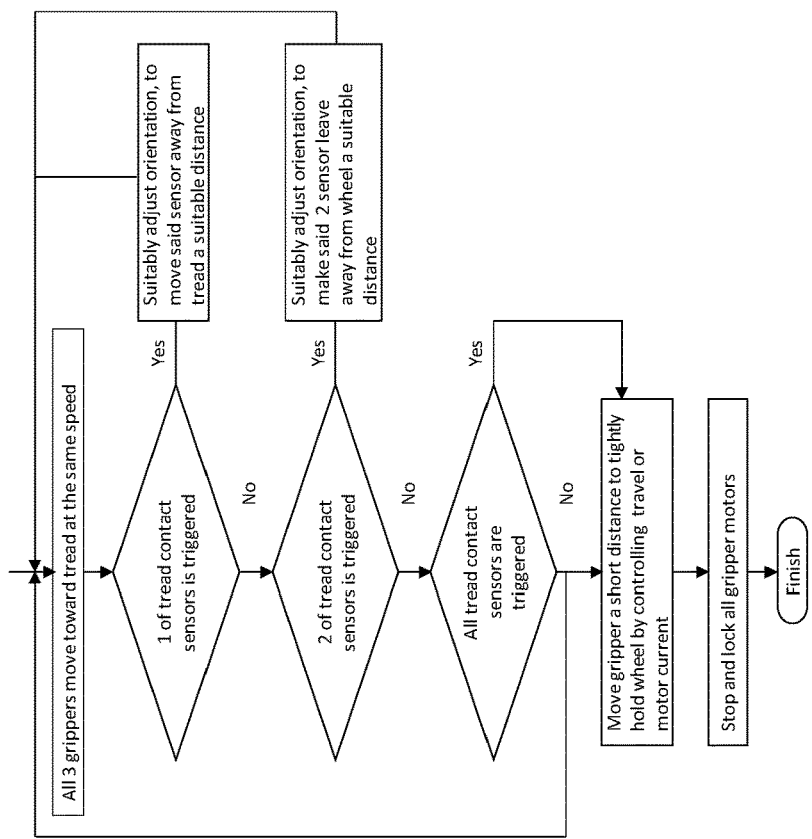
FIG. 53 is a schematic flow diagram of a wheel gripping control module for the overall control system of FIG. 48, such module according to an embodiment of the invention.
Figure 53:
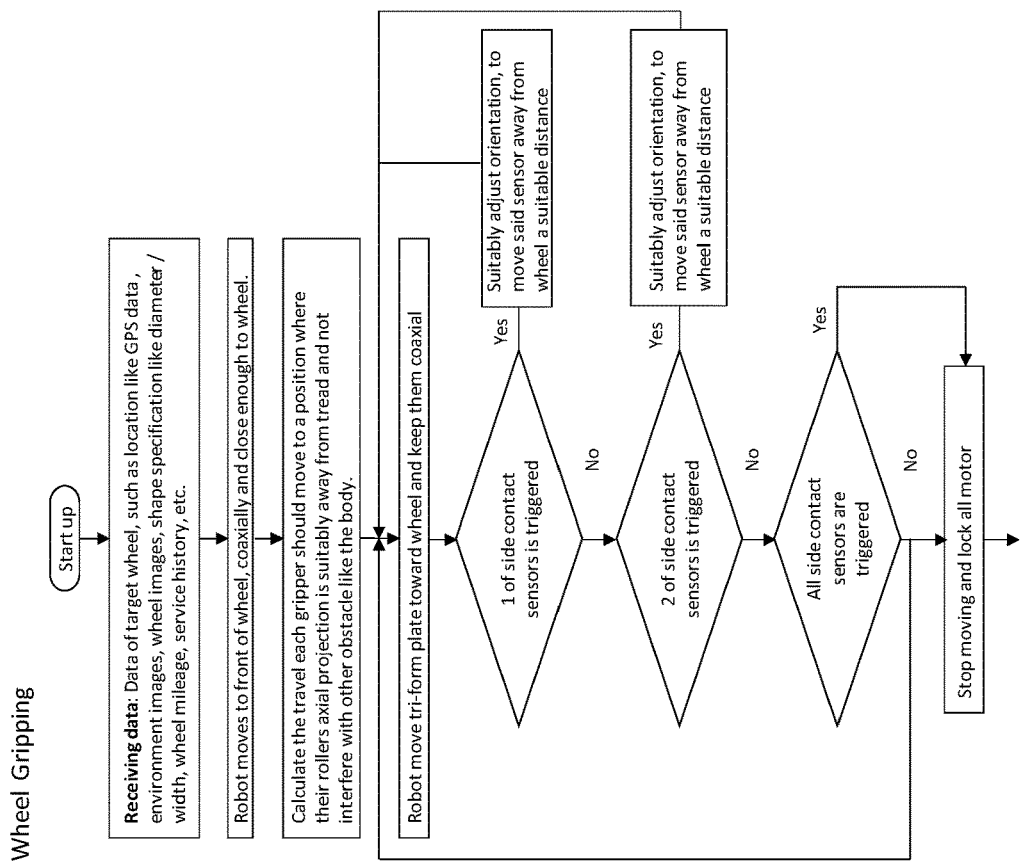

More accurate positioning is then achieved using three side surface access sensors 103, the ends of which are shown on FIG. 22 and the three tread surface access sensors 102, the ends of which are shown on FIG. 23. As shown in FIG. 22, as the tool approaches, one (or two) side surface sensor 103 will be triggered first. Forward motion of the chassis towards the tire continues but with a suitable tool orientation adjustment to restore a small spacing between the triggered side surface sensor and the side wall. Axis alignment is achieved when all three side sensors are triggered at which time the forward movement of the tool is stopped. The movement of the chassis 10 towards the wheel side wall, as controlled by outputs from the surface sensors 103, forms a second drive sub-system used to drive the grippers 78 in directions parallel to the operational axis. At the same time that the tool is being positioned relative to the tire side wall, the three grippers in the wheel cavity are moving radially inwardly towards the treaded surface (FIG. 23). Again, one (or two) tread access sensor 102 will be triggered first. Inward motion of the grippers continues but with a suitable tool adjustment to maintain a small spacing between the triggered tread access sensor and the tread surface. Proper positioning of the grippers is achieved when all three tread access sensors 102 are triggered. At this time, the grippers are moved a further short controlled travel to hold the wheel tightly enough for subsequent servicing operations, including wheel removal. The radially inward movement of the grippers, as controlled by outputs from the sensors 102, forms a third drive sub-system used to drive the grippers 78 in directions perpendicular to the operational axis. FIG. 53 is a schematic flow diagram of a wheel gripping control module.

U.S. application Ser. No. 16/104,792 describes the use of a robot wheel servicing tool to attach and detach wheel fasteners. Referring back to FIGS. 1 to 4, an exemplary fastener loader unit 14 is mounted on support plate 40 and has a set of parallel spindles 106, each rotatable about its longitudinal axis, the spindles being circularly arrayed. Sockets 108 at the spindle front ends are adapted to hold and rotate threaded fasteners 110 such as lug nuts configured for screw engagement with corresponding threaded fasteners such as threaded studs mounted on a vehicle mounted hub member. Rear ends of the spindles 106 are attached by universal joints 114 to motors 116 for rotating the spindles 106 about their axes. An adjustment mechanism 118 is used for synchronously altering the 'spread' of the spindle axes. In operation, for removing a wheel 26, the fastener loader unit 14 is operable to automatically place sockets 108 over the fasteners 110 of a vehicle-attached wheel and to unscrew the fasteners from complementary fasteners at the wheel hub. Similarly, for mounting a wheel, the fastener unit is operable to hold and automatically screw fasteners onto corresponding fasteners on the wheel hub. The fastener loader unit 14 must be moved between different locations and must be oriented at different angles in order to effect fastener removal or attachment. As described in U.S. patent application Ser. No. 16/104,792, some of these movements are automatically effected through the aegis of drives and mounting arrangements within the fastener loader unit itself. The fastener unit is mounted on support plate 40 and other movements of the fastener loader unit 14 are effected through manipulation of the support plate.

Figure 26:
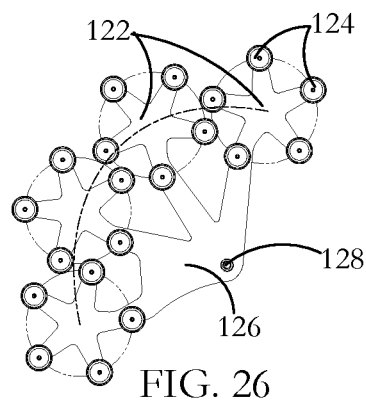
FIG. 26 is a schematic side view of a storage station forming a part of the storage sub-system of FIG. 24.
Figure 27:
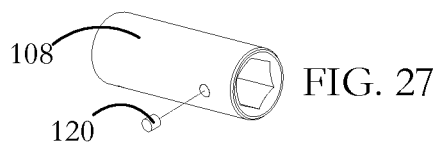
FIG. 27 is perspective view showing a socket mechanism for a fastener unit, the socket mechanism for temporarily retaining a wheel fastener in preparation for storage.
Figure 28:
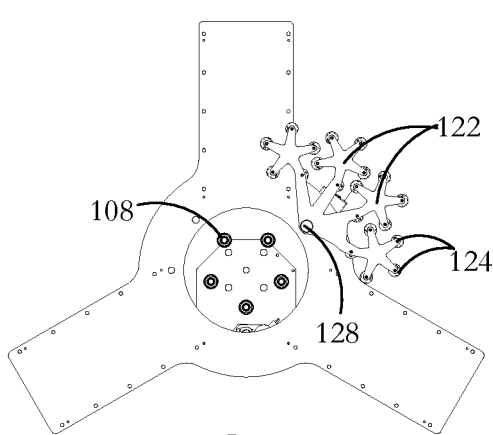
FIG. 28 is a front view of part of the fastener storage sub-system of FIG. 24 showing a fastener seat array and a fastener socket array at one stage in a fastener storage process.
Figure 29:
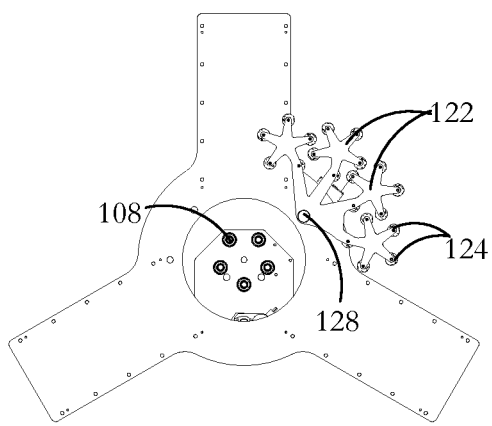
FIG. 29 is a view corresponding to FIG. 28 showing the fastener seat array and the fastener socket array at a later stage in the fastener storage process.

Once the wheel 26 is fully gripped, servicing of the wheel is performed by the robot tool with the wheel either on- or off-vehicle. In the latter case, the fastener unit 14 is deployed to remove fasteners such as lug nuts which are then stored by a fastener storage sub-system 15 which is shown with reference to FIGS. 24 to 32. Following removal from their wheel attachment positions, the fasteners 110 are initially held in the fastener sockets 108. As shown in FIG. 27, a fastener 110 is held in its socket 108 by a small permanent magnet 120 integrated into the socket barrel. As shown by FIGS. 28 and 29, the sockets 108 are collectively radially moved from a start position (FIG. 28) where they have just been untightened to a finish position (FIG. 29) where the fasteners 110 are in a circular array having a predefined storage-ready radius. As shown in FIG. 26, four storage stations 122 of the storage sub-system 15 each have five lug nut storage seats, the seats of each storage station being mounted in a circular array of the storage-ready radius. The storage stations 122 are mounted on plate 126 which is angularly rotatable around a shaft 128 attached to tri-form plate 98. The distance from the center axis of each 5-store-seat array to the pivot point is the same for each storage station. In this way, any one of the storage stations can be pivoted into a position where its center axis is aligned with the center axis of the socket array. Plate 126 is pivoted to a position in which the circular array of storage seats 124 at selectable storage station 122 is aligned with the circular array of sockets 108. The arrangement of fasteners is such that, when at the pivoted position, the seats of the storage seat array of the selected storage station are aligned with respective sockets of the socket array.

Figure 30:
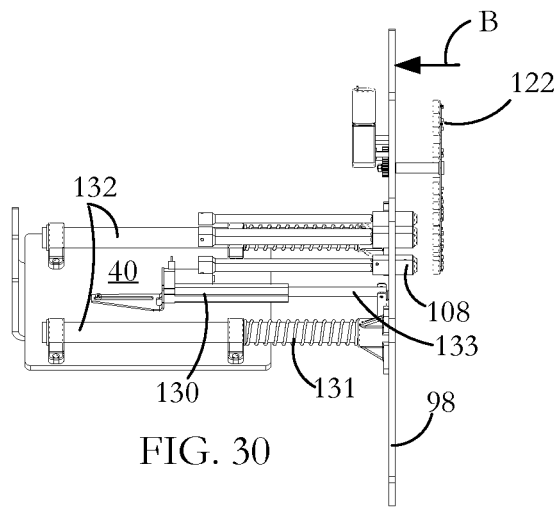
FIG. 30 is a side view of a part of the fastener storage sub-system of FIG. 24 showing an initial stage in transferring fasteners from fastener system sockets to storage seats of the fastener storage sub-system.
Figure 31:
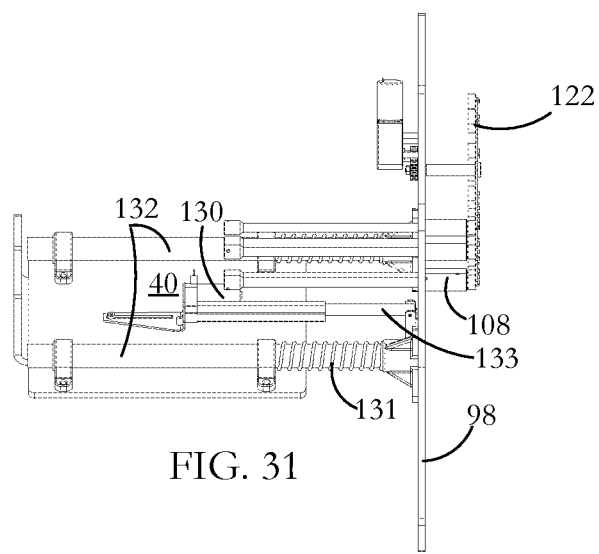
FIG. 31 is a side view corresponding to FIG. 30 but showing a subsequent stage in transferring the fasteners.
Figure 32:
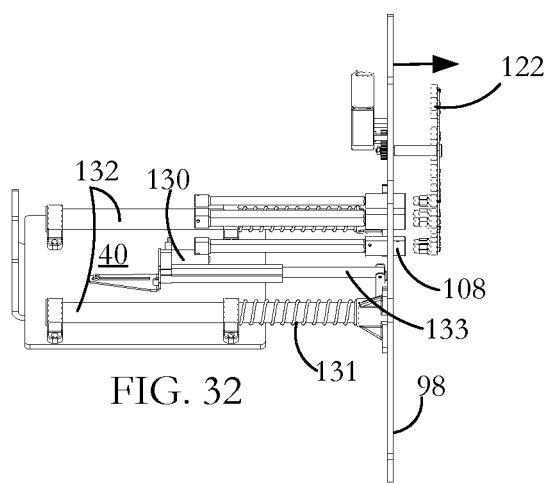
FIG. 32 is a side view corresponding to FIG. 31 but showing a yet later stage in transferring the fasteners.
Figure 54:
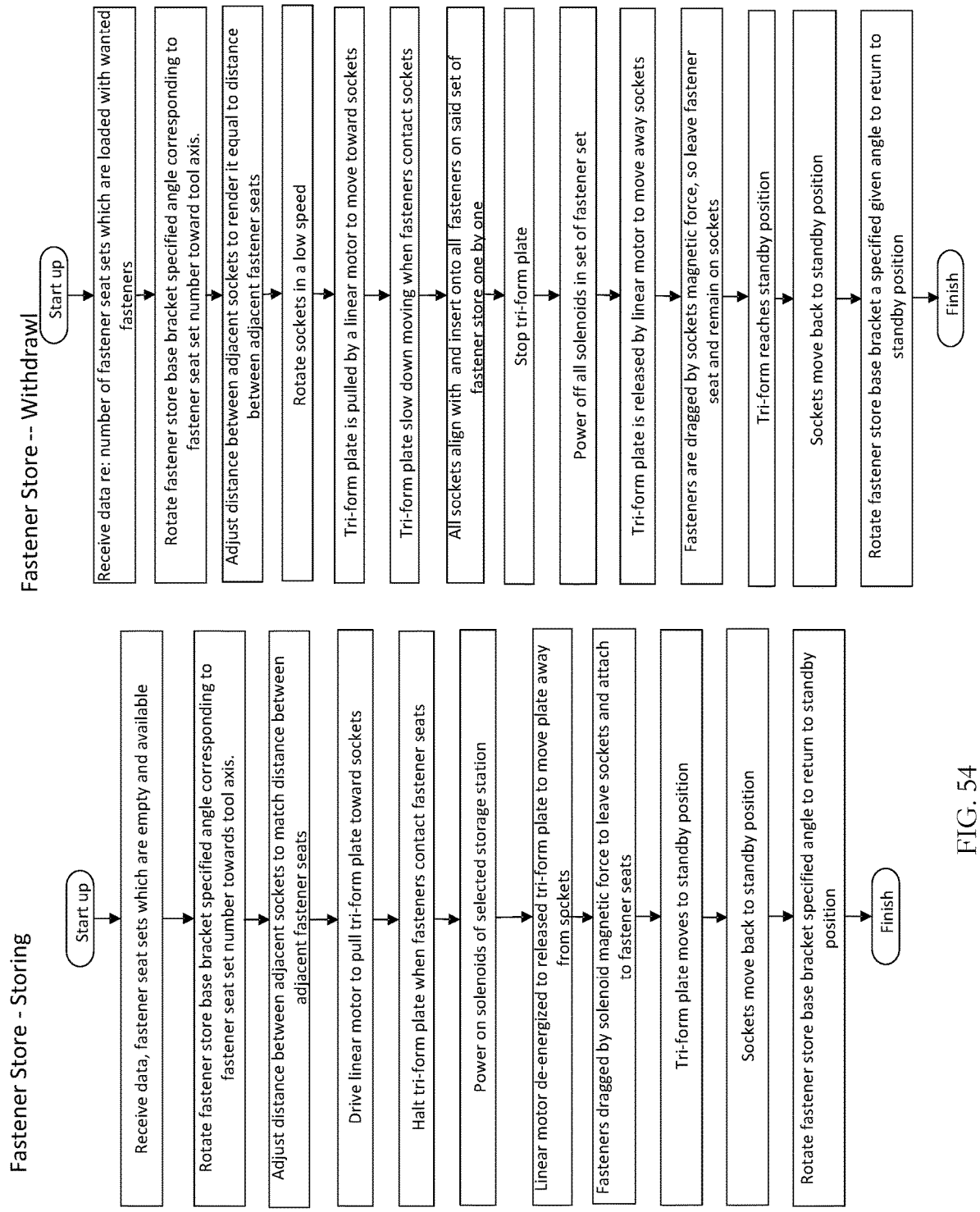
FIG. 54 is a schematic flow diagram of a fastener storage control module for the overall control system of FIG. 48, such module according to an embodiment of the invention.

As shown by FIGS. 30 to 32, the tri-form plate 98 is mounted on parallel shafts 132 which are slidably mounted on support plate 40. The plate 98 can be driven in the direction B by rod 133 of linear motor 130 to bring storage stations122 toward the sockets 108, until fasteners 110 on a selected held in the sockets 108 contact and engage respective storage seats 124 (FIG. 31). Each storage seat 124 has an associated electromagnet that is used to pull a fastener 110 from a socket 108 into a storage position after the storage seat124 engages the fastener. Linear motor 130 is then released and springs 131 drive the tri-form plate back so that fasteners 110 are pulled out of sockets 108 and remain locked onto the storage seats 124. The plate 126 is then pivoted around shaft 128 to lodge the storage stations 122 at a standby position. The electromagnets are maintained in a powered state to ensure the fasteners do not drop out of their storage seats 124 pending their reuse to mount a wheel. In an alternative embodiment, permanent magnets are located at each of the storage seats and electromagnets are located at the tool sockets. In a further alternative, electromagnets are installed at both the storage seats and the tool sockets. In one embodiment, the spacing of adjacent seats 124 is set to the spacing of adjacent tool sockets when the sockets are fully radially retracted. Optionally, the adjacent seat spacing is set to any value within the permitted range of adjacent tool socket spacing and, when transferring fasteners, the radial positions of the tool sockets are adjusted to match the fixed pattern of the storage seats. The quantity of storage seats at each station can be changed for different wheel configurations by changing the storage stations or using a different configuration of pivotal plate 126. Also, the quantity of storage stations can be changed depending on application demands. While a 20-lug nut store (4 wheels with 5 lug nuts per wheel) is illustrated, tool storage capacity can differ as between different models to meet application needs; for example, 4 and 5 fasteners for many automobiles and up to 12 or more for trucks and semi-trailers. For example, for rapid servicing, a first vehicle may have all wheels removed and be waiting for new wheels. In the wait period, the robot can be used to service another vehicle and so would have a larger storage capacity. When mounting a wheel, stored lug nuts are removed from storage stations and used to fasten a wheel to a vehicle wheel hub in essentially a reverse procedure. In another fastener storage embodiment, each storage station is mounted to a plate as a circular array, the arrays being concentric. When the socket-to-storage fastener transfer is to be made, the fastener loader sub-system spindles are spread so that the socket circular array matches the selected one of the storage seat circular arrays. FIG. 54 is a schematic flow diagram of a fastener storage control module.

Tire Inspection Sub-System

A wheel 26 that is rotatable on its hub can be serviced while the wheel remains mounted on the vehicle. Free on-vehicle rotation may be effected by powering the gripper motor to turn the powered gripper about its operational axis and so counter-rotate the wheel. Alternatively, if free rotation is not possible, the vehicle's central power unit may be operated to drive the wheel. If on-vehicle rotation is not possible at all or if the wheel needs to be detached from the vehicle for other purposes, it is removed as described above. Whether on-vehicle or off, the tire 44 is gripped by the gripper sub-system 18 so as to bring components of the tire inspection sub-system 20 to operational positions adjacent the tire 44 in preparation for inspection.

Figure 55:
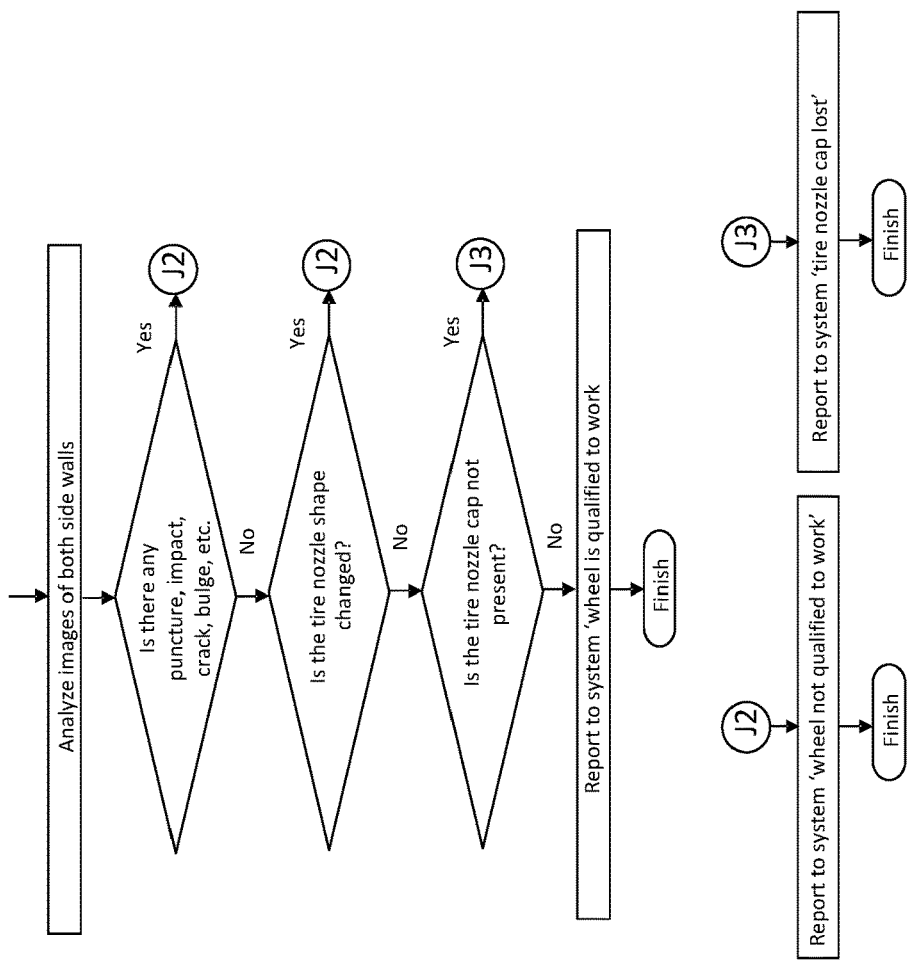
FIG. 55 is a schematic flow diagram of a tire inspection control module for the overall control system of FIG. 48, such module according to an embodiment of the invention.
Figure 55:
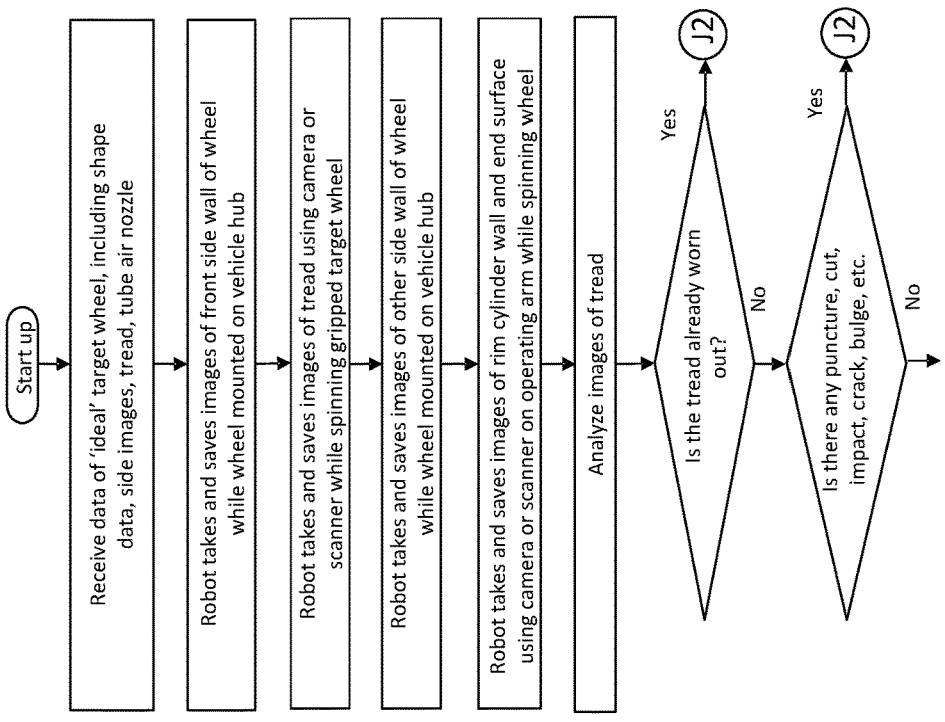

After a wheel 26 is successfully gripped by the grippers 78, it is driven to rotate at a slow speed or is driven intermittently to capture tire data, the condition of the tire and its tread being monitored by light-camera combinations mounted on or near the grippers 78 and forming part of a machine vision system, itself a part of the control system. Captured images of a wheel 26 are automatically compared to stored images and other data to determine and log the presence and location of, for example, bulges, nails, stones, scratches and cuts. In addition, the depth of remaining tread, whether the tread wear is uniform, and whether the tread is damaged are similarly analyzed. Light-camera combinations for monitoring tread are co-mounted with tread contact sensors 102. When a wheel is gripped, the inner wall of the tire—i.e. the wall nearer the vehicle is not easily accessible. To monitor inner tire wall condition, tire wall camera 134 is used, the camera being shown in standby position in FIG. 20. The camera is mounted on an articulated bracket 136 which is controlled by motors 138 to telescope and angularly rotate the bracket 136 to a working position where the camera 134 can view the tire inside wall. For inspecting the inner tire wall, the camera is moved forward a distance along the associated gripper axis and then is angularly rotated to reach a working position where the camera 134 can capture images of the tire inner wall. After inspection, the bracket 136 is moved through a reverse sequence to restore it to the standby position. To monitor outer tire wall condition, tire wall camera 140 is used, the camera being mounted on bracket 142. An exemplary flow diagram of operations undertaken in a tire inspection is shown in FIG. 48. FIG. 55 is a schematic flow diagram of a tire inspection control module.

Tire Pressure Sub-System

Figure 33:
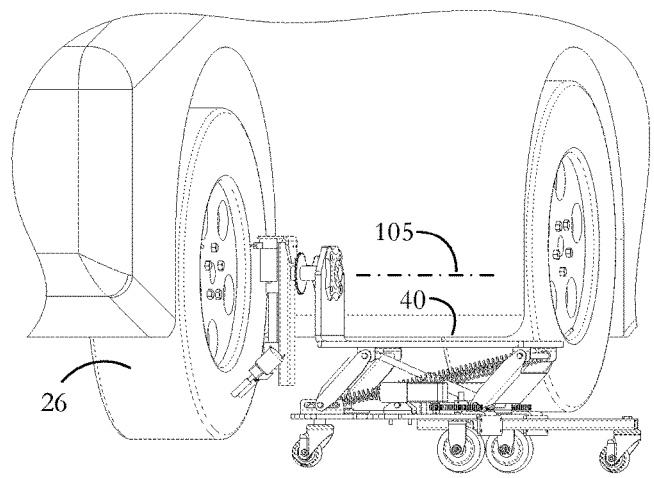
FIG. 33 is a perspective view from behind and one side of a part of the robot tool of FIG. 1 showing a tire pressure regulation sub-system according to an embodiment of the invention.
Figure 34:
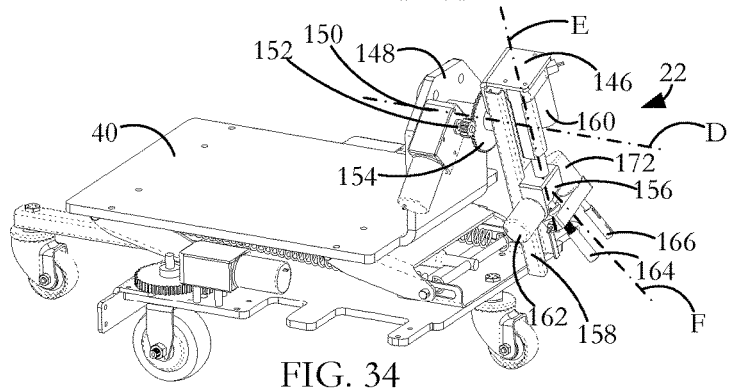
FIG. 34 is a top perspective view from behind and one side showing the tire pressure regulation sub-system adjusted in preparation for connection to a wheel injection valve.
Figure 35:
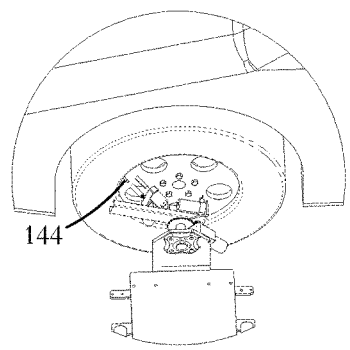
FIG. 35 is a scrap top perspective view from behind showing the tire pressure regulation sub-system connected to a wheel injection valve.
Figure 36:
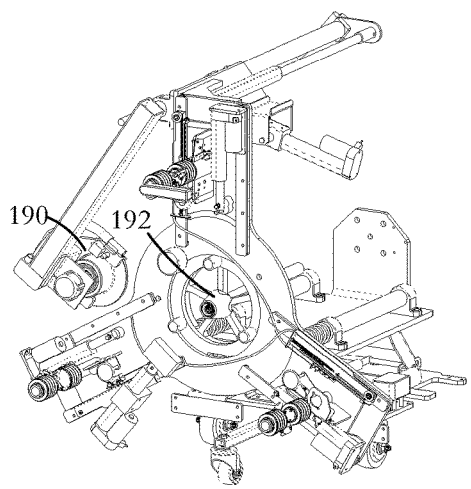
FIG. 36 is a top perspective view from the front and one side of a part of the robot tool of FIG. 1 showing a wheel balancing sub-system according to an embodiment of the invention.
Figure 37:
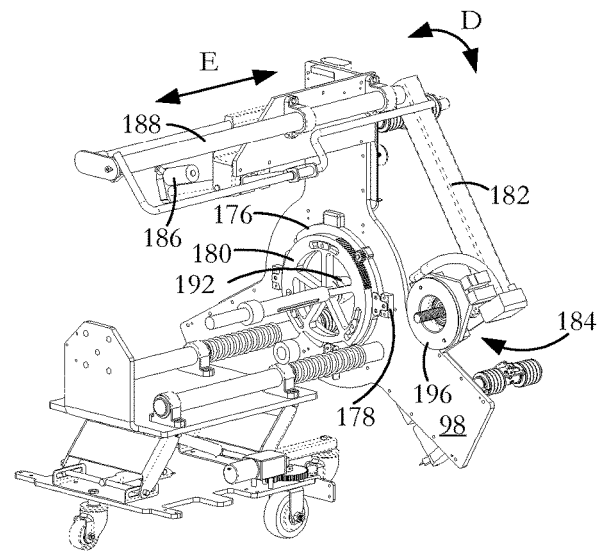
FIG. 37 is a top perspective view from the back and the other side corresponding to FIG. 36.

Referring to FIGS. 33 to 35, the robot tool has a sub-system 22 for testing tire pressure and for pumping or releasing air to correct tire pressure if the pressure is found to be under or over recommended pressure. For this service action, the target wheel 26 can be serviced without either its removal from, or rotation relative to, the vehicle because, once the robot tool 8 is within a general communication range, the tire pressure sub-system 22 is manoeuvred under the control system working with a machine vision system to bring attachment elements of the sub-system 22 to a tire injection valve 144. Once in position, the tire pressure sub-system 22 operates to grab, twist and remove an injection valve cap, to measure tire pressure, to pump or release air to the recommended tire pressure, to reposition and screw down the valve cap and finally to restore the tire pressure sub-system 22 to its standby position. Tire pressure service actions can be implemented regardless of the wheel rotation position because of inherent mobility capability provided by drives to the chassis 10, to the support plate 40 and to the tire pressure sub-system itself.

Elements of the tire pressure sub-system 22 are mounted on a frame 146 as shown in FIG. 34 which illustrates the back of the robot tool. The frame 146 is mounted to upstanding wall 148 integral with the support plate 40. The frame 146 is rotatable about tool operational axis D upon operation of rotary motor 150 acting through a drive pinion 152 and a driven gear 154. A carriage member 156 is slidably mounted on a linear rail arrangement 158 forming part of the frame 146. The carriage member 156 can be reciprocally driven in a direction E by linear motor 160 to desired stop positions. A bracket member 157 is mounted for angular movement to a desired inclination F under a drive from rotary motor 162. An air pressure unit 164 and a cap remover unit 166 are closely mounted on bracket member 157, support bodies for the units extending parallel to each other in inclination direction F. The cap remover unit 166 has an attachment tube with opposed fingers which are splayed outwardly as the attachment tube is manoeuvred onto a tire injection valve cap so as to grasp the cap and enable it to be turned. The fingers are lined with a layer of resilient gripping material or another form of resilient spring grip can be used. Rotary motor 172 is operated to rotate the cap remover tube and unscrew or screw down the cap from/onto a tire injection valve 144. An Air pressure unit 164 is pneumatically connected through nozzle 174 to a pressure sensor, air ducts, valves, air pump and a pneumatic control unit (none shown) connected to the control system for use in measuring tire pressure and delivering/releasing air at desired pressures to/from the tire injection valve 144. Imaging devices mounted on the tool are used to identify the position and orientation of a particular valve 144 so that the air pressure sub-system can be moved by suitable movement of the chassis and support plate motors and the motors 160, 162, 172 into registration with valve 144. In operation, the frame 146 and the elements mounted on it are moved to a first position to detach the valve cap from the wheel injection valve with the valve cap remover 166 and then shunted over to a second position at which air pressure can measured and air can pumped into or released via a connection between the air pressure unit 164 and the wheel injection valve.

Figure 58:
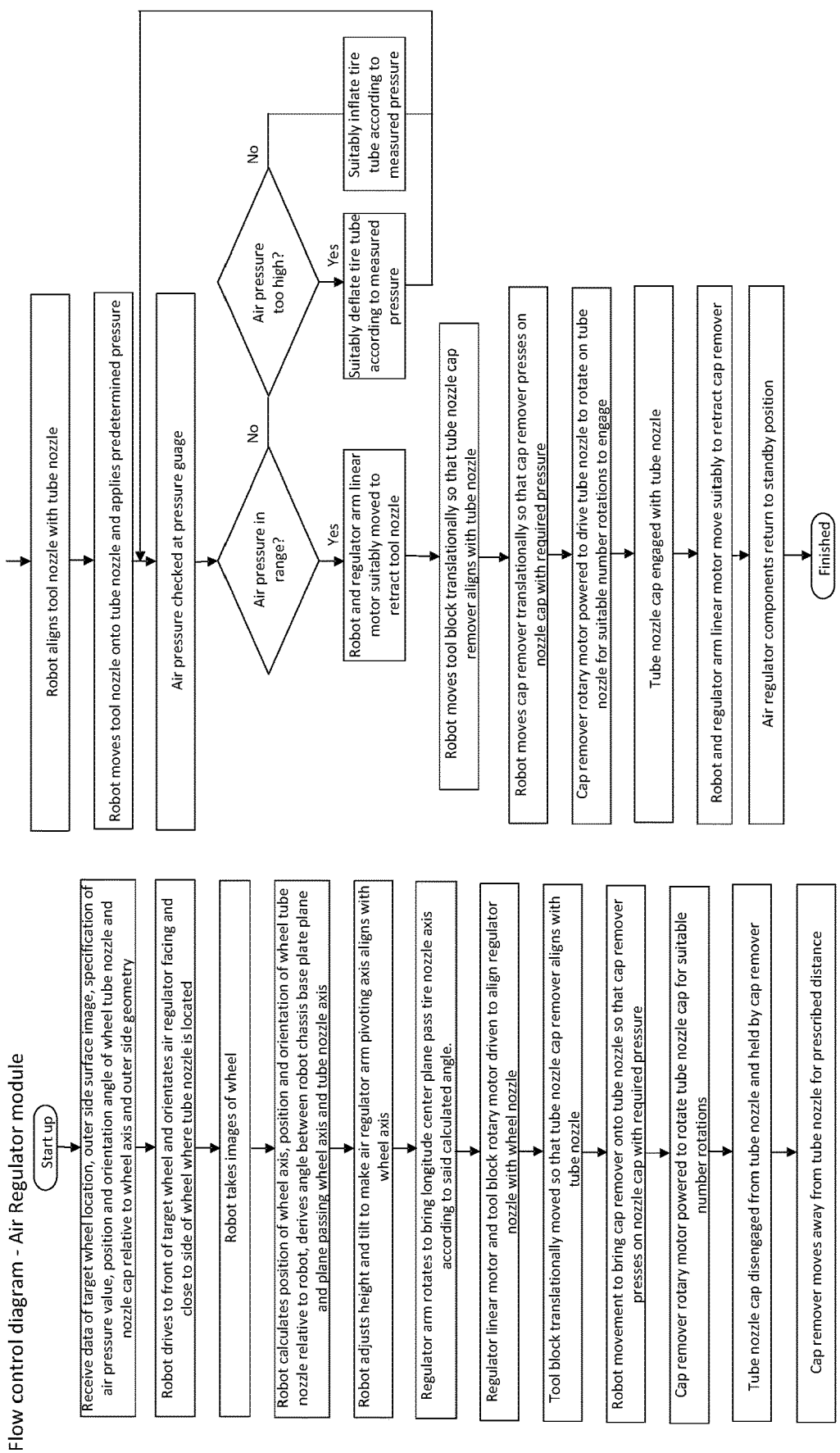
FIG. 58 is a schematic flow diagram of a pressure regulator control module for the overall control system of FIG. 48, such module according to an embodiment of the invention.

FIGS. 33 and 34 show the tool chassis 10 and support plate 40 but with tool components other than the pressure sub-system 22 not shown. FIG. 33 shows the pressure unit in a standby position beside a target wheel 26 to be serviced. Initially, axis D is unlikely to be aligned with the wheel axis and so drives to the chassis 10 and support plate 40 are operated until axial alignment is obtained. As shown by FIG. 34, drives to motors have been activated as needed to angularly adjust the position of the frame and the support bracket in readiness for placing the cap remover coaxial with and over the injection valve cap (FIG. 35). The cap remover is rotated by rotary motor to undo the cap which, following removal, remains held by the cap remover finger. The pressure unit is then moved backwards, shunted sideways to bring the pressure nozzle into alignment with the tire injection valve collar and then moved axially forward to press the nozzle over the valve collar until the engagement between the collar and the nozzle is sealed. A control sequence is then initiated to check air pressure and, as necessary, to pump air into, or release air from, the tire until the recommended tire pressure is reached. Then connection nozzle 174 is axially moved backward to leave the tire valve. The tool is again moved backwards and again shunted sideways to bring the cap remover into alignment with the injection valve collar. The valve cap remover is then moved axially forward to press the held cap onto the collar and rotary motor is operated to screw down the cap onto the collar until a required torque is obtained and the pressure unit can be removed leaving the cap in place. FIG. 58 is a schematic flow diagram of a pressure regulator control module.

Wheel Balancing Sub-System

Figure 38:
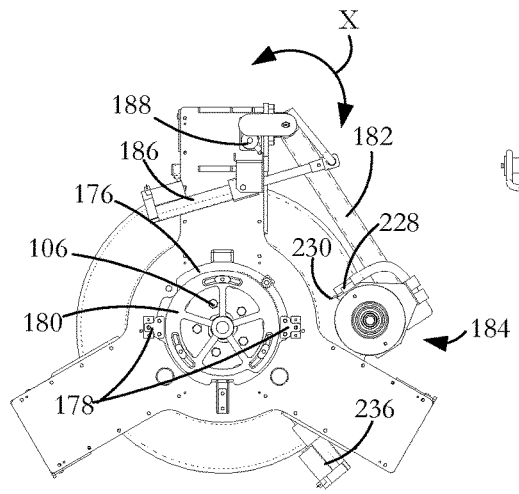
FIG. 38 is a back view of the wheel balancing sub-system of FIG. 36 showing an operating arm in a first position.
Figure 39:
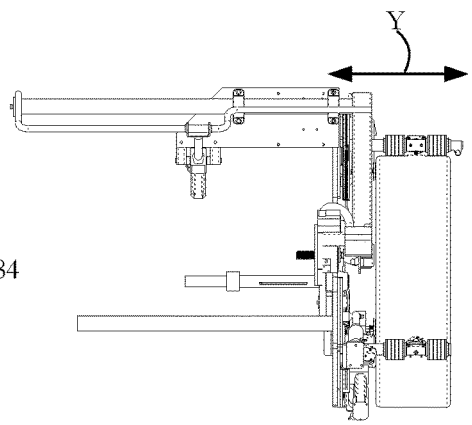
FIG. 39 is a side view corresponding to FIG. 38.

Referring to FIGS. 36 to 42, he robot wheel servicing tool 8 has a wheel balancer sub-system 24 for dynamically balancing a wheel 26 that has been detached using the previously described gripper sub-system. As shown in FIG. 38, the wheel balancer includes a first back plate 176 mounted to tri-form plate 98 by brackets 178. A second back plate 180 is mounted coaxially against plate 176 at a slot and pin arrangement allowing limited circumferential adjustment of 178 plate relative to plate 176. Plate 176 has a central circular opening and spoked plate 178 has sector-shaped access openings, the openings, subject as necessary to such a circumferential adjustment, permitting full access by the fastener unit (not shown) for removing and attaching fasteners on a wheel.

As shown in FIG. 38, the wheel balancer 24 has an operating arm 182 on which is mounted a pressure plate assembly 184 and several subsidiary mechanisms used in the course of wheel balance testing and correction. The operating arm 182 is driven by motor 186 for angularly rotating the operating arm in direction X and a linear motor for reciprocally moving the operating arm in the direction Y.

Figure 40:
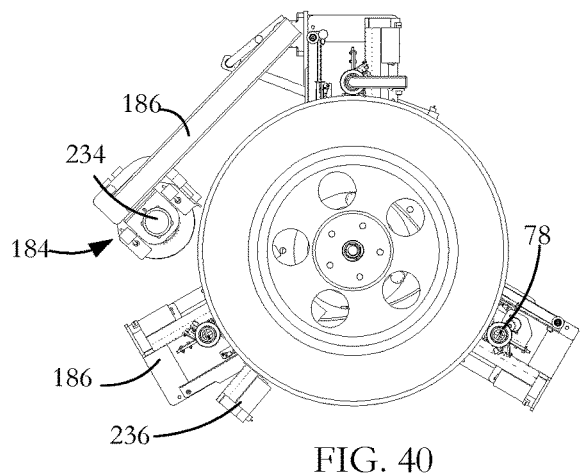
FIG. 40 is a front view of the wheel balancing sub-system of FIG. 36 showing the operating arm in a second position.
Figure 41:
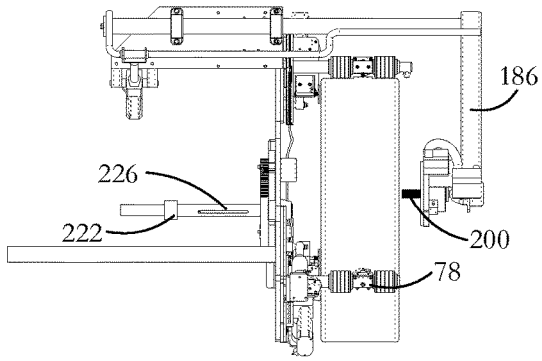
FIG. 41 is a side view corresponding to FIG. 40.
Figure 42:
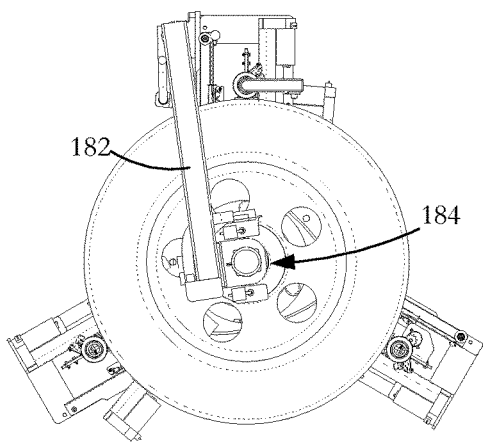
FIG. 42 is a front view of the wheel balancing sub-system of FIG. 36 showing the operating arm in a third position.

One purpose of the operating arm 182 is to transfer the pressure plate assembly 184 between an 'off axis' standby position shown in FIGS. 38 and 40 and an 'on axis' operational position shown in FIG. 42 in preparation for a wheel balancing operation. In the course of transfer, as shown in FIG. 40, the operating arm moves the pressure plate assembly and a pressure plate holder so that they clear a wheel 26 held in grippers 78.

Another purpose of the operating arm 182 is to remove a wheel center cap from the wheel. A center cap is a cover mounted at the center of the wheel by spring clips. In normal road use, the cap protects a wheel spindle nut and bearing from dust and other foreign bodies. The cap must be removed from the wheel in order that the wheel can be mounted in a manner enabling performance of dynamic balance check. To remove the cap, the operating arm is manipulated so that as an end of threaded shaft forming part of pressure plate assembly 184 approaches the wheel (FIG. 41), it pushes the cap against the force of the spring clips to eject it from the wheel. Mounted to a reverse side of the tri-form member is a center cap catching mechanism (FIGS. 46 and 47). Before cap ejection, an operating arm of the cap catching mechanism is driven by linear motor to a point where a catcher head is aligned with the wheel center. When the cap is ejected from the wheel, it is caught and held by the catcher head. The catcher head is retracted back to its standby position and remains there until wheel balancing is completed. Currently, commercially available wheel center caps vary in form, size and composition. It is anticipated that as robotic servicing of vehicle wheels becomes prevalent, center cap design will become standardized. In one form, such caps have a ferromagnetic core and a catcher arm head houses an electromagnet operable to magnetically attract and hold the cap as it is ejected from the wheel.

Once the cap is removed and the pressure plate assembly 184 is on axis (FIG. 41), the operating arm 182 is further manipulated to move the pressure plate assembly 184 along the tool operational axis towards a cone assembly 192 (FIG. 42). As shown in FIG. 44, the pressure plate assembly 190 has a drum 194 and integral flange 196. Fixed in the interior of the drum is a bearing 198, the inner race of the bearing being fixed to oversize head end of threaded shaft 200. The head of shaft 200 has a shaped driver recess 202 to receive the end of an impact driver mounted on the operating arm 182. Pins 204 integral with the drum flange 196 are received in corresponding bores 206 on holder 190 when the drum assembly is in a standby or approach position. Holes 208 in the pins 204 accommodate solenoid plungers movable into and out of the holes 208 to attach and release the drum 194 relative to the holder 190. As shown in FIG. 45, the cone assembly 192 has a main shaft 210 with a radial thrust bearing 212 fixed to the shaft inner end and bearing against flange 214. A center bore cone block 216 is freely rotatably mounted on a needle roller bearing 218 fixed to the end of the shaft 210. The drum 194 is joined to shaft 200 through bearing 198 so that the drum is free to rotate about shaft 200. The cone block 216 has a corresponding internally threaded center bore 220. In setting up for the balance testing operation, the drum shaft 200 is screwed into the internal thread on shaft 210 of the cone assembly by a rotary impact motor bit applied to recess 202 so as to clamp the wheel between the drum and the cone block. In setting up for the balance test, the cone assembly 192 is driven towards the gripped wheel 26 by linear motor 222, the shaft 210 being constrained to move parallel to the tool operational axis by engagement of pin 224 in slot 226.

In setting up for a balance test, contact between the drum shaft 200 and the cone block 216 is detected by the on-board machine vision system or by monitoring an increase in current to the rotary impact motor 234 caused by resistance to further movement of shaft. Once contact is made, the shaft 200 inside drum 194 is rotatably driven by rotary impact motor 234 to screw the shaft 200 into the bore 220 with the wheel hub rim sandwiched between the cone block 216 and the drum 194. In standby and approach positions, the drum assembly 184 is held by drum pins 204 locating in bracket arm bores 206, the pins being secured in the bores by solenoid plungers located in holes 208. After the drum 194, wheel 26 and cone block 216 are clamped together, the solenoids are powered on to release the drum pins 204 from bores 206. The operating arm 182, minus the pressure plate assembly, is then returned to its standby position. Drum assembly removal from a wheel following a wheel balance test is effected essentially by using a reverse sequence of these steps.

Once the wheel is clamped as described, the drum, wheel, cone combination is spun by rotation of the powered gripper 78 (FIG. 43) at a slow or fast rate depending on the servicing operation. Alternatively, a larger roller, separate from, or in place of, the powered gripper motor, is mounted and rotates so as to produce counter-rotation of the wheel for balance tests where required testing speed may be quite high.

Mounted on the operating arm 182 (FIG. 38) is a gravel remover 228 which is used with the tire inspection sub-system 20 to identify the presence and location of gravel and like bodies in the tire treaded surface 84 as the wheel 26 is being spun at low speed. Once identified, the gravel is removed so that its weight will not affect a subsequent wheel balancing procedure. The gravel remover includes a picker or post 230 having a tip which, by coordinated drive to the motors controlling the operating arm 182, is guided and directed into both primary back-to-front grooves and subsidiary cross grooves such as diagonally extending sipes. Adjacent the picker tip is a nozzle pneumatically connected to a vacuum suction pump (not shown) which is used to suck dislodged gravel through the nozzle and into a storage bin.

Also mounted on the operating arm 182 is an 'old' weight removal head which can be removed before a wheel balance test or can be removed following the test if an imbalance is detected. In order to remove an old weight, the control system compares a camera-made image of the wheel rim and a stored image of a corresponding wheel rim without balance weights to identify the location and type of old balance weight. The operating arm 182 is then guided a weight removal head beside rim surface and the wheel is rotated to bring the weight against a chisel edge forming part of the removal head. Once lodged together, the operating arm is axially withdrawn to pull the old weight off the rim. The falling weight is collected in an appropriately sited bin.

Figure 56:
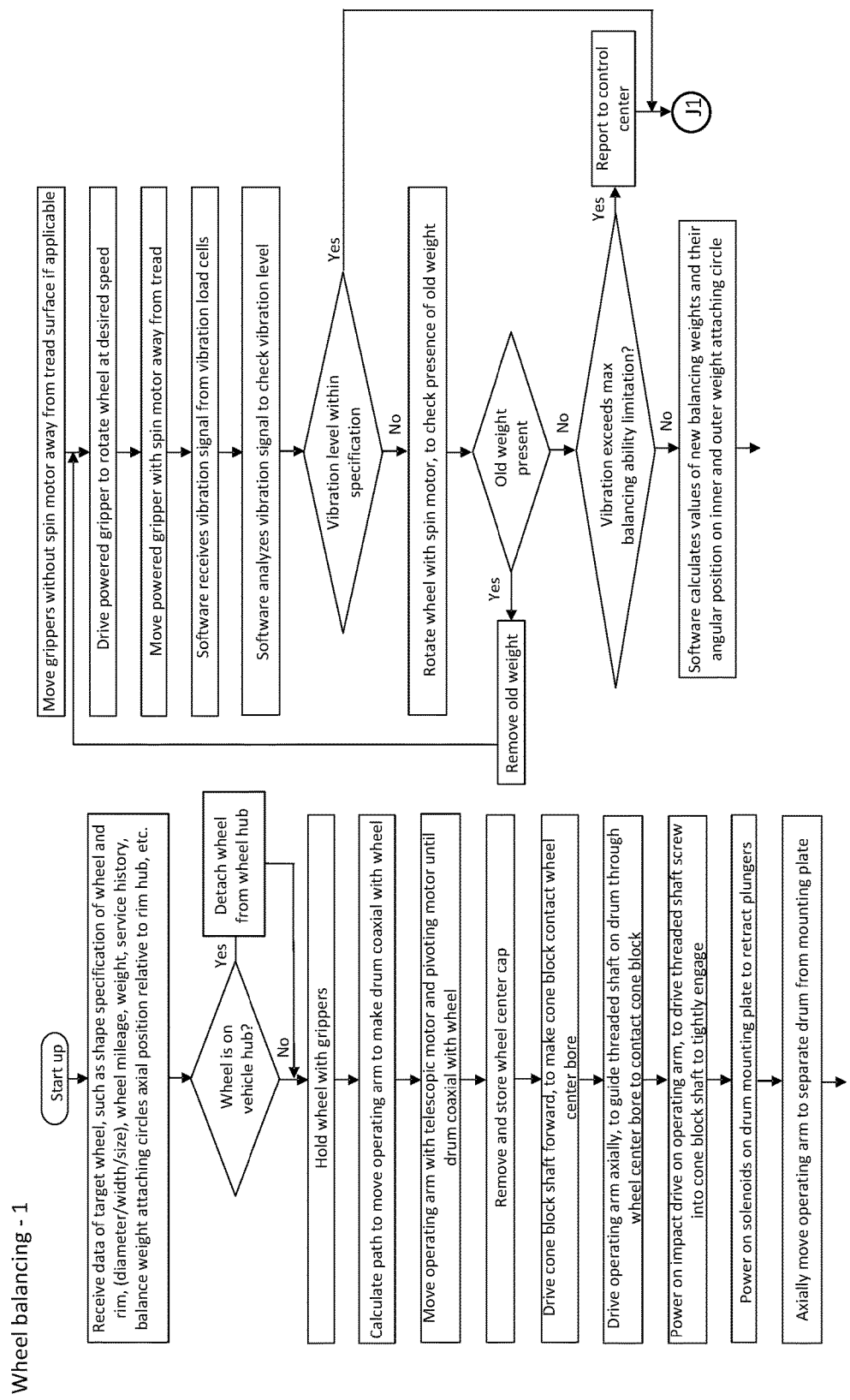
FIG. 56 is a schematic flow diagram of part of a wheel balancing control module for the overall control system of FIG. 48, such module according to an embodiment of the invention.
Figure 57:
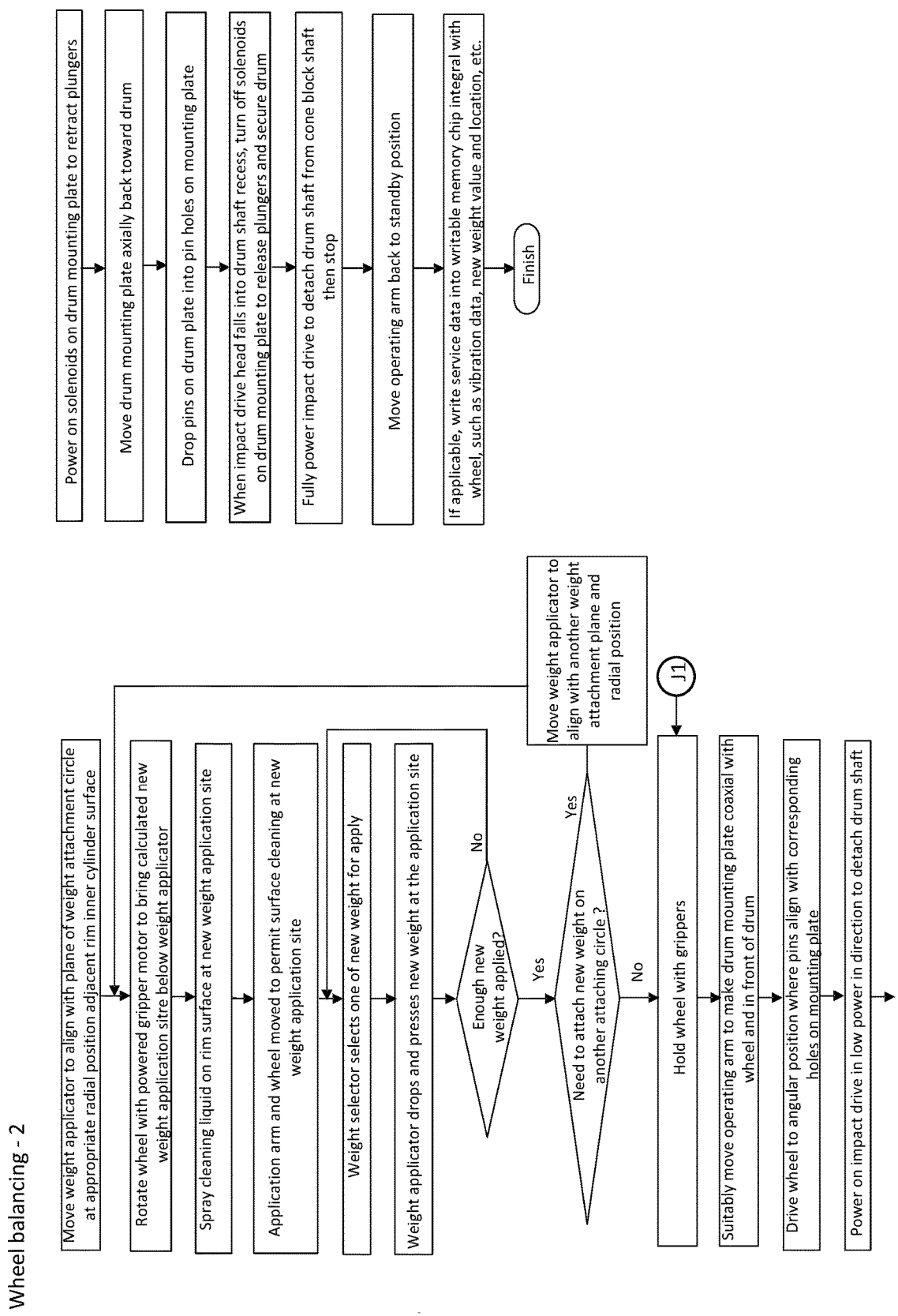
FIG. 57 is a schematic flow diagram of part of another wheel balancing control module for the overall control system of FIG. 48, such module according to an embodiment of the invention.

For a dynamic balance test, the powered gripper 78 is rotated at a higher rate to produce a corresponding faster rotation of the wheel. Once the wheel is rotating at a desired speed, the grippers 78 are lifted from the tread surface 84 so that the wheel 26 spins freely. The shaft 210 of the cone assembly has a rotary encoder (not shown) for indicating the rotary angle of the cone block and therefore the wheel when it is spinning so that, during a balance test, rotary positions of the wheel can be related to the occurrence of wheel vibration artefacts by the control system. Any of a number of commercially available vibration analysis sub-systems may be integrated with the robot tool control system and used to gather out-of-balance information. Transducers for such vibration analysis sub-systems can, for example, be mounted at the brackets 178 with monitoring systems to measure x, y and z forces and to compute the extent and direction of imbalance. Wheel imbalance is resolvable into forces and moments acting at inner and outer planes of the wheel rim. The imbalance information is used with stored or imaged rim size information to determine the precise weight and wheel rim mount positions of balance weights needed to balance the wheel. FIGS. 56 and 57 are schematic flow diagrams showing a wheel balancing control module.

The operating arm 182 has an old weight removal head, a rim cleaning head, a weight selection head and a weight application head. The tool heads can, for example, be mounted on the operating arm in a manner similar to a turret lathe and are powered by associated motors under the control of the control system working with the machine vision system. The operating arm 182 is telescopically extensible from a base mounting on the tool frame to enable a tool head to be moved to a desired radial position depending on the radius of the wheel rim. The arm is also angularly rotatable about the base to enable a tool head to be moved to positions at the inner and outer rim flanges. By coordinated wheel rotation and manipulation of operating arm 182, the rim cleaning head is brought to the computed weight fixture site where it sprays cleaning liquid at the fixture position and cleans the site using a rotatable buffer. A weight application head on the operating arm then picks a weight(s) from a cassette, delivers it to the fixture site in the correct orientation and presses it against the rim to fix the the weight(s) to the rim by means of an adhesive backing layer on the weight(s). Balance weights are normally fixed to the inner and outer wheel rim flanges to achieve balance. Finally, the wheel itself is rotatable about its central axis. Because the angular position of the wheel is known from a real-time output from the rotary encoder during the balance test, the weight application head and the desired weight application location(s) on the rim can be accurately brought together. A weight cassette can contain different weights or can contain standard weights. In the latter case, several weights may be applied to make up the computed weight. As previously described, another function of the operating arm 182 is to manipulate a camera mounted on the arm into a position behind a wheel gripped by the gripper sub-system so as to inspect the inner side of the wheel rim.

While the previous description is of a robot wheel servicing tool that combines a chassis sub-system 10, a tool support sub-system 12, a fastener detaching/attaching sub-system 14, a fastener storage sub-system 15, a jacking sub-system 16, a gripper sub-system 18, a tire inspection sub-system 20, a tire pressure sub-system 22, and a wheel balancing sub-system 24, in other embodiments of the invention a subset of these sub-systems form the hardware part of the robot tool with the control system having a corresponding subset of control software. For example, in some applications, a tire pressure sub-system does not form part of the robot tool; in other applications, a wheel balancing sub-system does not form part of the tool.

Other variations and modifications will be apparent to those skilled in the art and the embodiments of the invention described and illustrated are not intended to be limiting. The principles of the invention contemplate many alternatives having advantages and properties evident in the exemplary embodiments.

What is claimed is:

1. A robot tool comprising a gripping system having an array of at least three gripping units spaced about and defining a system operational axis,
    a first drive sub-system operable to angularly reorientate the array so as to angularly reorientate the operational axis and to translationally move the array so as to translationally move the operational axis,
    a second drive sub-system for driving the gripping units in a direction parallel to the operational axis,
    a third drive sub-system for driving the gripping units in directions perpendicular to the operational axis,
    a first array of sensors spaced about the operational axis for sensing, along respective axes parallel to the operational axis, the positions of respective sidewall surface parts of a wheel located adjacent the robot tool,
    a second array of sensors spaced about the operational axis for sensing the position of respective tread surface parts of the wheel along respective directions perpendicularly to the operational axis,
    a control having inputs from the sensors of the first and second arrays and outputs responsive to the inputs to effect operation of the drive sub-systems to
        align the operational axis with a rotational axis of the wheel,
        move the gripping units parallel to the operational axis to positions adjacent the wheel tread surface, and
        to move the gripping units perpendicularly to the operational axis to contact and grip the wheel tread surface.

2. The robot tool claimed in claim 1, further comprising a sensor pad connected to a respective one of the sensors for transmitting an input to the sensor indicating a contact made between the sensor pad and the wheel, while absorbing dynamic impact from the wheel.

3. The robot tool claimed in claim 1, wherein the chassis has a plurality of rollers for supporting the robot tool on a support surface, and the first drive sub-system has independent drives to the rollers to effect movement of the chassis on the support surface such as to alter the orientation of the operational axis in a first direction.

4. The robot tool claimed in claim 3, further comprising a support body above and connected to the chassis by a linkage, the support body supporting the gripping system, and a drive for adjusting the linkage to alter height of the support body above the chassis, thereby to alter the location of the operational axis.

5. The robot tool claimed in claim 3, further comprising a support body above and connected to the chassis by a linkage, the support body supporting the gripping system, and a drive for adjusting the linkage to the support body thereby to alter the orientation of the operational axis in a second direction different from the first direction.

6. The robot tool as claimed in claim 3, wherein the independent drives to the rollers are operable to implement any combination of rectilinear motion, curvilinear motion and spin of the chassis on the support surface.

7. The robot tool claimed in claim 1, further comprising a wheel inspection sub-system co-mounted with one of the gripping units.

8. The robot tool as claimed in claim 1, further comprising a tire pressure measuring and regulating sub-system co-mounted with the wheel gripping system and having an operational axis coincident with the operational axis of the wheel gripping system.

9. The robot tool as claimed in claim 1, further comprising a wheel balancing sub-system co-mounted with the wheel gripping system and having an operational axis coincident with the operational axis of the wheel gripping system.

10. The robot tool claimed in claim 1, further comprising a fastener attachment and detachment sub-system for applying and releasing fasteners to a supporting member of the wheel to clamp and unclamp a wheel to and from the supporting member, the fastener attachment and detachment sub-system co-mounted with the wheel gripping system and having an operational axis coincident with the operational axis of the wheel gripping system.

11. The robot tool claimed in claim 1, further comprising a jacking sub-system mounted to the chassis for raising a part of a vehicle to enable removal or mounting of a wheel to be serviced.

12. The robot tool claimed in claim 1, wherein at least one of gripping units has at least one camera co-mounted therewith for inspecting a part of the gripped wheel as the gripped wheel is rotated about the operational axis, said part being at least one of the outer sidewall of the gripped wheel, the tread surface of the gripped wheel, and an exterior side of a rim of the gripped wheel.

13. The robot tool claimed in claim 1, wherein at least one of the gripping units has an articulating arm co-mounted therewith and a camera co-mounted on the articulated arm manipulable into a position to inspect an inner side of the gripped wheel as the gripped wheel is rotated about the operational axis.

14. The robot tool claimed in claim 1, wherein at least one of the gripping units has at least one roller rotatable on a respective shaft, the third drive sub-system operable to bring the roller to bear against the tread surface.

15. The robot tool claimed in claim 14, further comprising a roller drive to rotate at least one of the rollers about its axis, thereby to rotate the gripped wheel in counter-rotation about the operational axis.

16. The robot tool claimed in claim 14, wherein said at least one of the gripping units has first and second rollers mounted with respective axes of rotation thereof within a common plane containing the operational axis, and wherein the third drive sub-system is operable to bring the rollers to bear against the wheel tread surface at respective regions of the wheel tread surface which are intersected by said plane and are adjacent to one another.

17. The robot tool as claimed in claim 16, wherein one of the sensors of the second array is mounted between the first and second rollers.

\* \* \* \* \*